US012243331B2

(12) United States Patent
Takamatsu et al.

(10) Patent No.: US 12,243,331 B2
(45) Date of Patent: Mar. 4, 2025

(54) CONTROL DEVICE, PROJECTION SYSTEM, CONTROL METHOD, AND PROGRAM

(71) Applicant: Sony Group Corporation, Tokyo (JP)

(72) Inventors: Takashi Takamatsu, Tokyo (JP); Hiroshi Imamura, Tokyo (JP); Seishi Tomonaga, Tokyo (JP); Koji Nagata, Tokyo (JP); Toru Nagara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 257 days.

(21) Appl. No.: 17/924,357

(22) PCT Filed: Jun. 16, 2021

(86) PCT No.: PCT/JP2021/022802
§ 371 (c)(1),
(2) Date: Nov. 10, 2022

(87) PCT Pub. No.: WO2021/256483
PCT Pub. Date: Dec. 23, 2021

(65) Prior Publication Data
US 2023/0186651 A1  Jun. 15, 2023

(30) Foreign Application Priority Data
Jun. 19, 2020  (JP) .................................. 2020-105856

(51) Int. Cl.
*H01L 29/94* (2006.01)
*G03B 21/20* (2006.01)
(Continued)

(52) U.S. Cl.
CPC ....... *G06V 20/593* (2022.01); *G03B 21/2053* (2013.01); *G03B 21/53* (2013.01); *G03B 21/60* (2013.01); *G06T 7/521* (2017.01)

(58) Field of Classification Search
CPC ...... G06V 20/593; G06V 20/56; G06V 20/59; G06V 40/28; G06V 40/10; G06V 40/20;
(Continued)

(56) References Cited

U.S. PATENT DOCUMENTS

| | | | |
|---|---|---|---|
| 10,242,457 B1 * | 3/2019 | Sibley | H04N 9/3182 |
| 2001/0054989 A1 * | 12/2001 | Zavracky | G02B 27/017 |
| | | | 345/8 |
| 2008/0106702 A1 * | 5/2008 | Huonker | B64D 11/06 |
| | | | 353/82 |
| 2009/0288123 A1 * | 11/2009 | Havlovick | B64D 11/0624 |
| | | | 340/963 |
| 2014/0267687 A1 * | 9/2014 | Loghmani | B60R 1/28 |
| | | | 348/113 |

(Continued)

FOREIGN PATENT DOCUMENTS

| | | |
|---|---|---|
| JP | 2005-88864 A | 4/2005 |
| JP | 4955309 B2 | 6/2012 |

(Continued)

OTHER PUBLICATIONS

International Search Report and Written Opinion mailed on Sep. 7, 2021, received for PCT Application PCT/JP2021/022802, filed on Jun. 16, 2021, 9 pages including English Translation.

*Primary Examiner* — Joseph Suh
(74) *Attorney, Agent, or Firm* — XSENSUS LLP

(57) ABSTRACT

The control device 50 includes a control unit 52 that controls a state of video projected onto a predetermined projection plane by a projector 20 provided in a space in the moving body 10 on the basis of space situation information input from a sensor that detects a space situation in the moving body 10.

19 Claims, 28 Drawing Sheets

(51) Int. Cl.
*G03B 21/53* (2006.01)
*G03B 21/60* (2014.01)
*G06T 7/521* (2017.01)
*G06V 20/59* (2022.01)

(58) Field of Classification Search
CPC .............. G03B 21/2053; G03B 21/53; G03B 21/60; G03B 21/142; G06T 7/521; B60K 2360/21; B60K 2360/334; B60K 2360/48; B60K 2360/741; B60K 35/00; B60K 35/22; B60K 35/405; B60K 35/65; B60K 35/81; H04N 9/317; H04N 9/3182; H04N 13/239; H04N 13/271; H04N 9/3194; H04N 13/204; B60R 11/02
See application file for complete search history.

(56) References Cited

U.S. PATENT DOCUMENTS

2016/0041386 A1* 2/2016 Rodriguez Moreno ..................... G06F 3/017 345/7
2020/0184219 A1 6/2020 Mugura
2021/0155122 A1* 5/2021 Lee .................. G06V 20/59

FOREIGN PATENT DOCUMENTS

| JP | 2015-15677 A | 1/2015 |
| WO | 2019/044536 A1 | 3/2019 |
| WO | 2019/124158 A1 | 6/2019 |
| WO | 2019/181233 A1 | 9/2019 |

\* cited by examiner

CONTROL DEVICE, PROJECTION SYSTEM, CONTROL METHOD, AND PROGRAM

CROSS-REFERENCE TO RELATED APPLICATIONS

The present application is based on PCT filing PCT/JP2021/022802, filed Jun. 16, 2021, which claims priority to JP 2020-105856, filed Jun. 19, 2020, the entire contents of each are incorporated herein by reference.

FIELD

The present disclosure relates to a control device, a projection system, a control method, and a program.

BACKGROUND

A technique for automatically providing an appropriate reproduced sound field regardless of a seating position of a passenger in an automobile is known. For example, in the following Patent Literature 1, an on/off state of a power source of each of a plurality of displays provided in an automobile is detected, and a voice signal is corrected according to this detection result such that reproduced sound of a plurality of speakers becomes appropriate at a position where the display in the on state is used.

A technique with which a projector that projects video on a projection plane adjusts a focal length of a projection lens of the projector depending on presence of a human between the projection plane and the projector. For example, in Patent Literature 2 below, in a case where presence of a human is sensed between a projection plane and a projector, focus adjustment is performed such that the focal length of the projection lens is fixed in an immediately preceding state while the presence of the human is sensed.

CITATION LIST

Patent Literature

Patent Literature 1: JP 2005-88864 A
Patent Literature 2: Japanese Patent No. 4955309

SUMMARY

Technical Problem

In recent years, there has been a demand for a technique capable of enhancing an entertainment property by providing a moving body with a projection device such as a projector and projecting video in the moving body.

However, in Patent Literatures 1 and 2 described above, it has not been considered to provide most appropriate video to a passenger in a moving body.

Therefore, the present disclosure proposes a control device, a projection system, a control method, and a program capable of providing most appropriate video to a passenger in a moving body.

Solution to Problem

In order to solve the above problem, a control device according to one aspect of the present disclosure includes: a control unit that controls a state of video projected onto a predetermined projection plane by a projection device provided in a space in a moving body on a basis of space situation information input from a sensor that detects a space situation in the moving body.

DESCRIPTION OF EMBODIMENTS

Embodiments of the present disclosure will be described below in detail with reference to the drawings. In the present description and the drawings, components having substantially the same functional configuration are denoted by the same reference signs, and redundant description will be omitted.

Figure 1:
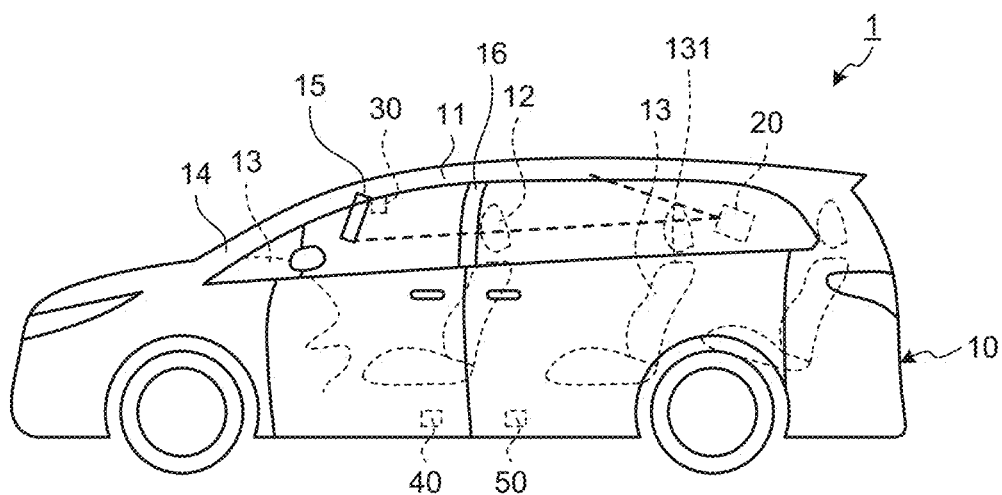
FIG. 1 is a schematic side view of a projection system applied to each embodiment of the present disclosure.
Figure 2:
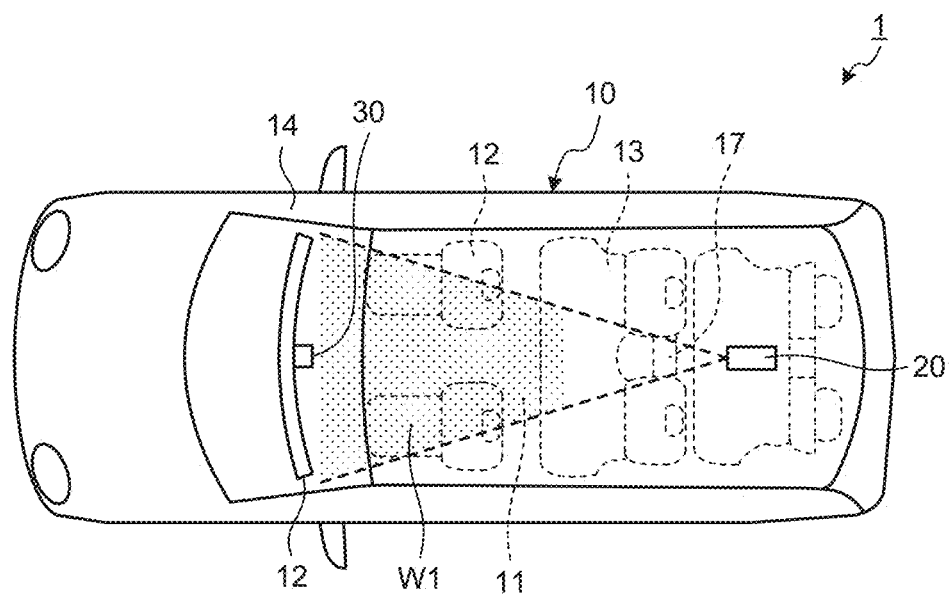
FIG. 2 is a schematic top view of the projection system applied to each embodiment of the present disclosure.

Note that the description will be given in the following order.
1. Configuration of projection system
1-1. Schematic configuration of projection system
1-2. Configuration of projector
1-3. Configuration of sensor unit
1-4. Configuration of content reproduction device
1-5. Configuration of control device
1-6. Problem of projector provided in conventional moving body
2. First embodiment
2-1. Functional configuration of projection system
2-2. Configuration of projector
2-3. Configuration of sensor unit
2-4. Configuration of control device
2-4-1. Functional configuration of control unit
2-5. Processing of projection system
2-6. Actions and effects
3. Second embodiment
3-1. Functional configuration of projection system
3-2. Configuration of sensor unit
3-3. Configuration of control device
3-3-1. Functional configuration of control unit
3-4. Processing of projection system
3-5. Actions and effects
4. Third embodiment
4-1. Functional configuration of projection system
4-2. Configuration of sensor unit
4-3. Configuration of control device
4-3-1. Functional configuration of control unit
4-4. Processing of projection system
4-5. Actions and effects
5. Fourth embodiment
5-1. Functional configuration of projection system
5-2. Functional configuration of control unit
5-3. Processing of projection system
5-4. Actions and effects
6. Fifth Embodiment
6-1. Functional configuration of projection system
6-2. Configuration of sensor unit
6-3. Configuration of control device
6-3-1. Functional configuration of control unit
6-4. Processing of projection system
6-5. Actions and effects
7. Sixth Embodiment
7-1. Functional configuration of projection system
7-2. Configuration of sensor unit
7-3. Configuration of control device
7-3-1. Functional configuration of control unit
7-4. Processing of projection system
7-5. Actions and effects
8. Application example to moving body
9. Conclusions 1. Configuration of Projection System 1-1. Schematic Configuration of Projection System FIG. 1 is a schematic side view of a projection system applied to each embodiment of the present disclosure. FIG. 2 is a schematic top view of the projection system applied to each embodiment of the present disclosure.

A projection system 1 illustrated in FIGS. 1 and 2 is a system that is provided in a moving body 10 and provides video to a passenger on board in the moving body 10. Here, examples of the moving body 10 include an automobile, an electric vehicle, a hybrid electric vehicle, a motorcycle, a bicycle, a personal mobility, an airplane, a drone, a ship, a robot, a construction machine, and an agricultural machine (tractor). Hereinafter, an automobile will be described as an example of the moving body 10. In FIGS. 1 and 2, a description will be given assuming that the number of passengers on board the moving body 10 is 6 people (6 seats), but the present invention is not limited to this, and can also be applied, for example, 2 people (2 seats) or 4 people (4 seats).

The projection system 1 illustrated in FIGS. 1 and 2 includes a projector 20, a sensor unit 30, a content reproduction device 40, and a control device 50.

1-2. Configuration of Projector

First, the configuration of the projector 20 will be described.

Under the control of the control device 50, the projector 20 projects video toward a ceiling 11 having a free-form curved surface of the moving body 10 and a projection plane that is the rearview mirror portion 15 (sun visor) so that all passengers can visually recognize the video in the moving body 10. In the moving body 10, the projector 20 is disposed behind and above a rear seat 13 that is a position not on the movement line of the passenger. Specifically, as illustrated in FIGS. 1 and 2, the projector 20 is disposed behind the rear seat 13 and above a shoulder 131 of the rear seat 13. Furthermore, the projector 20 is arranged in the moving body 10 so as to be able to project video onto the ceiling 11 in the upper front direction of the moving body 10. Note that in each embodiment of the present disclosure, the projector 20 functions as a projection device. In FIGS. 1 and 2, the projector 20 may be removable with respect to the moving body 10. Furthermore, in FIGS. 1 and 2, the projector 20 projects video toward the long direction of the moving body 10, but the present invention is not limited to this, and the projector may be configured to project video toward the short direction of the moving body 10. Furthermore, in FIGS. 1 and 2, only one projector 20 is provided in the moving body 10, but for example, a plurality of projectors may be provided in the moving body 10, or a projector may be provided outside the moving body 10 to project video into the moving body 10. The installation place of the projector 20 is not limited to the rear of the rear seat 13, and may be, for example, the ceiling of the moving body 10, and can be appropriately changed. Note that a detailed configuration of the projector 20 will be described later.

1-3. Configuration of Sensor Unit

Next, the configuration of the sensor unit 30 will be described.

The sensor unit 30 detects the number and the seating positions of passengers in the moving body 10, and outputs a detection result of this to the control device 50. A plurality of the sensor units 30 are arranged in the moving body 10. Specifically, the sensor unit 30 is arranged in an A pillar portion 14, a rearview mirror portion 15, a B pillar portion 16, and a center console 17 of the moving body 10. The sensor unit 30 arranged in the A pillar portion 14 and the rearview mirror portion 15 detects a passenger and a seating position in a front seat 12 of the moving body 10. The sensor unit 30 arranged in the B pillar portion 16 and the center console 17 detects a passenger and a seating position in the rear seat 13. The sensor unit 30 is achieved by using a camera capable of imaging color image data, a stereo camera for parallax image data having parralax, a time of (TOF) camera (sensor) capable of imaging distance image data having depth information, a line-of-sight detection sensor capable of detecting a line of sight of a passenger, and the like. The sensor unit 30 may be further provided with a stereo camera, a TOF camera, or the like that is provided behind the rear seat 13 of the moving body 10 and capable of detecting the shape of an internal space of the moving body 10. Note that the configuration of the sensor unit 30 will be described later.

1-4. Configuration of Content Reproduction Device

Next, the configuration of the content reproduction device 40 will be described.

The content reproduction device 40 outputs various types of information including content data to the projector 20 under the control of the control device 50. The content reproduction device 40 reads content data such as video data stored in, for example, a hard disk drive (HDD), a solid state drive (SSD), a memory card, a DVD, or the like, converts the read content data into a predetermined format, and outputs the content data to the projector 20. Here, content data includes map data, text data, graphic data, and the like other than video data. Note that the content reproduction device 40 may acquire content data from an external server via a network and output the acquired content data to the projector 20. Of course, the content reproduction device 40 may output, to the projector 20, content data input with a mobile phone. The content reproduction device 40 may be achieved by using a navigation system or the like that displays position information of the moving body 10.

1-5. Configuration of Control Device

Next, the configuration of the control device 50 will be described.

The control device 50 controls each unit constituting the projection system 1 including the moving body 10. The control device 50 functions as a part of an electronic control unit (ECU) of the moving body 10, for example. Specifically, the control device 50 acquires various types of information from various sensors in the moving body 10, and controls in an integrated manner the projection system 1 including the moving body 10 by cooperating with another ECU. The control device 50 controls the state of the video projected by the projector 20 on the basis of space situation information indicating a space situation of the moving body 10 detected by the sensor unit 30. Specifically, the control device 50 controls the focus state of the video projected onto the projection plane by the projector 20 on the basis of space situation information indicating a space situation of the moving body 10 detected by the sensor unit 30. Note that a detailed configuration of the control device 50 will be described later.

1-6. Problem of Projector Provided in Conventional Moving Body

In the conventional projection device including the projector 20, the projection plane is assumed to be a flat surface. Therefore, the conventional projection device does not assume large screen projection toward the ceiling 11 of the moving body 10 forming a free-form aspect, and does not assume oblique projection from the rear toward the front. As a result, in a case where the conventional projection device is provided on the moving body 10, the quality of the projected video (image) changes depending on the seating position of the passenger, for example, the front-rear position of the passenger.

Furthermore, in the conventional projection device, the passenger views video at a predetermined distance from the projection plane. However, in a case where the conventional projection device is provided in the moving body 10, a distance at which the passenger visually recognizes the video is also close, and thus, it becomes easy to grasp a difference in the video and whether the video is good or bad.

Furthermore, the number and the seating positions of the passengers on board the moving body 10 also change in a scene of using the moving body 10. For this reason, the conventional projection device needs to project the video corresponding to the number and the seating positions of passengers in the moving body 10. However, in the conventional projection device, the number and the seating positions of passengers in the moving body 10 are not considered at all.

As described above, in the conventional projection device, in a case where the projection device is provided in the moving body 10, it has not been considered to provide the most appropriate video to the passenger in the moving body 10.

2. First Embodiment

2-1. Functional Configuration of Projection System

Next, the functional configuration of the projection system 1 according to the first embodiment will be described.

Figure 3:
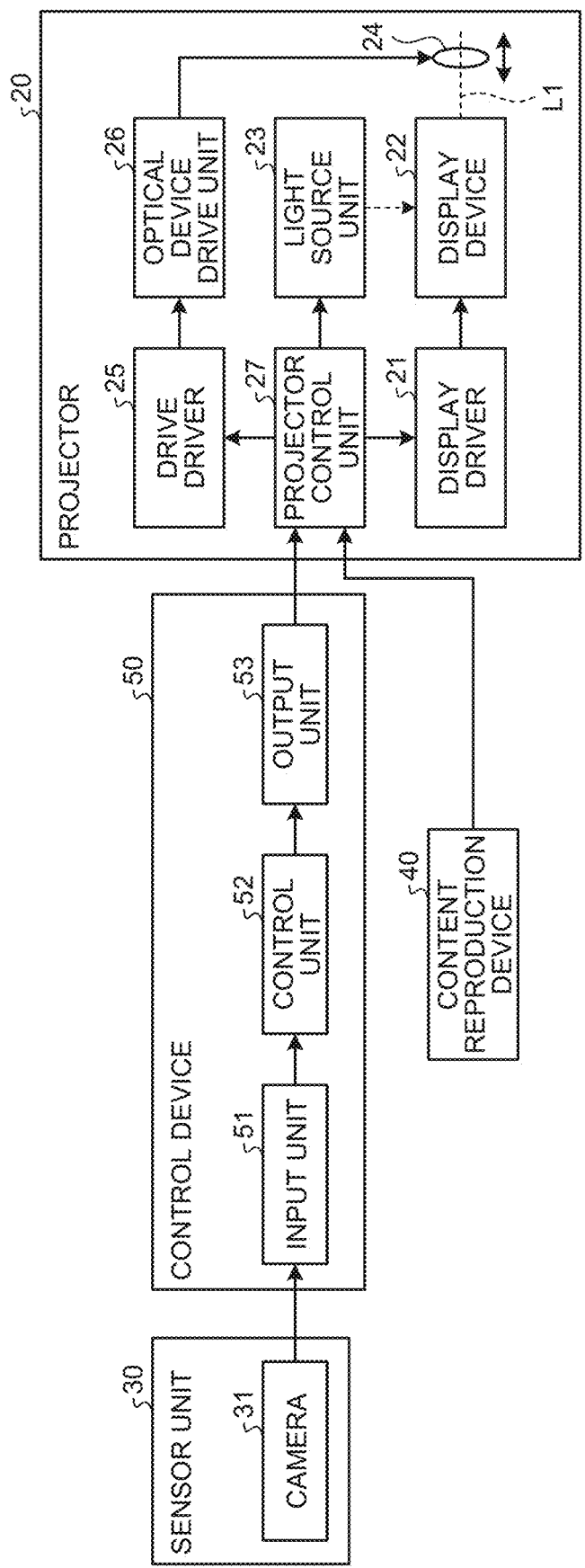
FIG. 3 is a block diagram illustrating a functional configuration of a projection system according to a first embodiment.

FIG. 3 is a block diagram illustrating the functional configuration of the projection system 1 according to the first embodiment.

As illustrated in FIG. 3, the projection system 1 includes the projector 20, the sensor unit 30, the content reproduction device 40, and the control device 50.

2-2. Configuration of Projector

First, the configuration of the projector 20 will be described.

The projector 20 includes a display driver 21, a display device 22, a light source unit 23, a projection lens 24, a drive driver 25, an optical device drive unit 26, and a projector control unit 27.

The display driver 21 performs predetermined image processing on the content data input from the content reproduction device 40 and outputs the content data to the display device 22 under the control of the projector control unit 27. Here, the predetermined image processing is gain processing, white balance processing, format conversion processing, or the like. The display driver 21 is achieved by using a memory and a processor having hardware such as a central processing unit (CPU), a field-programmable gate array (FPGA), or a digital signal processor (DSP).

The display device 22 displays video or an image corresponding to the content data input from the display driver 21. The display device 22 is achieved by using a display panel such as liquid crystal or organic electro luminescence (EL).

The light source unit 23 irradiates a display plane of the display device 22 with illumination light under the control of the projector control unit 27. The light source unit 23 is achieved by using a xenon lamp, a light emitting diode (LED) lamp, one or a plurality of lenses, a prism, a mirror, and the like.

The projection lens 24 projects (emits), toward the projection plane, reflected light reflected by the display plane of the display device 22. The projection lens 24 is achieved by using one or a plurality of lenses, a prism, and the like. The projection lens 24 is provided so as to be movable along an optical path L1.

Under the control of the projector control unit 27, the drive driver 25 generates a drive signal for driving the optical device drive unit 26, and outputs this generated drive signal to the optical device drive unit 26. The drive driver 25 is achieved by using, for example, a PWM pulse circuit or the like.

The optical device drive unit 26 adjusts the focus state of the projector 20 and the projection area of the video by moving the projection lens 24 along the optical path L1 according to a drive signal input from the drive driver 25. Specifically, the optical device drive unit 26 adjusts the focus position of the video projected by the projector 20 by moving a focus lens of the projection lens 24 along the optical path L1. The optical device drive unit 26 is achieved by using a pulse motor, a voice coil motor, a DC motor, and the like. Note that in a case where the projection lens 24 is configured using a tilt lens (tilt shift lens capable of tilt), the optical device drive unit 26 is only required to adjust the focus position of the video projected by the projector 20 by directing the optical axis of the projection lens 24 in any of a tilt direction, a tilt direction, and a shift direction.

The projector control unit 27 controls the drive driver 25 on the basis of a control signal input from the control device 50 described later, and by moving the projection lens 24 along the optical path L1, controls the focus state of the video projected onto the projection plane by the projector 20. The projector control unit 27 is achieved by using a memory and a processor having hardware such as a CPU, an FPGA, or a DSP.

2-3. Configuration of Sensor Unit

Next, the functional configuration of the sensor unit 30 will be described.

The sensor unit 30 includes at least a camera 31.

The camera 31 includes an optical system having one or a plurality of lenses, and an imaging element such as a charge coupled device (CCD) sensor or a complementary metal oxide semiconductor (CMOS) sensor that generates color image data by receiving a subject image formed by this optical system. Note that color filters in a Bayer array are arranged on a light receiving surface of the imaging element. The camera 31 sequentially outputs color image data to the control device 50 by imaging the inside of the moving body 10 at a predetermined frame rate under the control of the control device 50.

2-4. Configuration of Control Device

Next, the functional configuration of the control device 50 will be described.

The control device 50 includes an input unit 51, a control unit 52, and an output unit 53.

The input unit 51 outputs, to the control unit 52, the space situation information input from the sensor unit 30. Specifically, the input unit 51 receives image data and various types of information input from the camera 31 of the sensor unit 30, and outputs the input image data and various types of information to the control unit 52. The input unit 51 is achieved by using, for example, an input I/F circuit, an HDMI (registered trademark) input terminal, or the like.

On the basis of the space situation information input from the input unit 51, the control unit 52 generates a control signal for controlling the state of the video projected by the projector 20 and outputs this control signal to the output unit 53. The control unit 52 is achieved by using a memory and a processor including hardware such as a CPU, an FPGA, or a DSP. Note that a detailed configuration of the control unit 52 will be described later.

The output unit 53 outputs the control signal input from the control unit 52 to the projector 20. The output unit 53 is achieved by using, for example, an output I/F circuit, an HDMI output terminal, or the like.

2-4-1. Functional Configuration of Control Unit

Next, the detailed functional configuration of the control unit 52 will be described.

Figure 4:
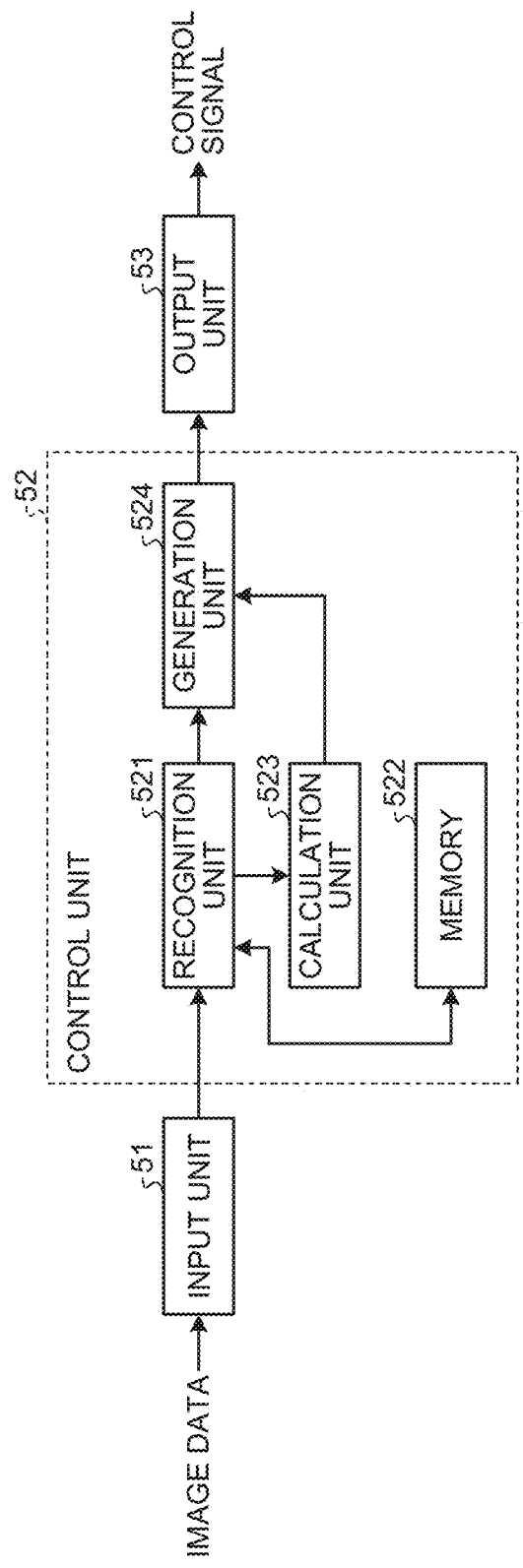
FIG. 4 is a block diagram illustrating a detailed functional configuration of a control unit according to the first embodiment.

FIG. 4 is a block diagram illustrating a detailed functional configuration of the control unit 52.

As illustrated in FIG. 4, the control unit 52 includes a recognition unit 521, a memory 522, a calculation unit 523, and a generation unit 524.

The recognition unit 521 recognizes the number and the seating positions or passengers in the moving body 10 on the basis of the space situation information input from the input unit 51. Specifically, by performing known template matching or the like on the basis of the color image data input from the camera 31 and moving body information of the moving body 10 stored in the memory 522, the recognition unit 521 recognizes the number and the seating positions of passengers in the moving body 10. Here, the moving body information is image data indicating an internal space in which the moving body 10 is in an unmanned state, space data (CAD data) indicating the internal space in the moving body 10, and the like. The recognition unit 521 outputs a recognition result to the calculation unit 523 and the generation unit 524. Furthermore, on the basis of the image data that is the space situation information input from the input unit 51, the recognition unit 521 recognizes at least one of the head position and the eye position of the passenger of the moving body 10 and outputs this recognition result to the calculation unit 523 and the generation unit 524. Note that the recognition unit 521 recognizes (detects) the number of passengers, the seating position, the head position, the eye position, and the like in the moving body 10 by template matching or the like, but for example, the number of passengers, the seating position, the head position, the eye position, and the like may be recognized using a learning result subjected to machine learning.

The memory 522 stores the space situation in the moving body 10, the position of a projection plane onto which the projector 20 projects video, the projection region, and the moving body information on the moving body 10. The memory 522 is achieved by using a volatile memory, a nonvolatile memory, and the like.

The calculation unit 523 calculates, for each passenger, the distance between the seating position of the passenger recognized by the recognition unit 521 and the projection plane of the video projected by the projector 20 stored in the memory 522, and outputs this calculation result to the generation unit 524. Specifically, the calculation unit 523 calculates, for each passenger, the distance between the viewpoint position (the position of the center of the head or the eye) of the seated passenger recognized by the recognition unit 521 and the projection plane of the video projected by the projector 20, and outputs this calculation result to the generation unit 524.

On the basis of the recognition result input from the recognition unit 521 and the calculation result input from the calculation unit 523, the generation unit 524 generates a control signal for controlling the focus state of the video projected by the projector 20, and outputs this control signal to the projector 20. Specifically, the generation unit 524 generates a control signal for controlling the focus state of the video projected by the projector 20 on the basis of the number of passengers recognized by the recognition unit 521 and the seating position of the passenger. More specifically, on the basis of the number of passengers recognized by the recognition unit 521, the seating position of the passenger, and the distance for each passenger calculated by the calculation unit 523, the generation unit 524 generates a control signal for adjusting the focus position of the projection lens 24 of the projector 20, and outputs this control signal to the projector 20. Furthermore, on the basis of the number of passengers recognized by the recognition unit 521, the seating position of the passenger, and the distance for each passenger calculated by the calculation unit 523, the generation unit 524 generates a control signal for improving the quality of a specific region in the video projected by the projector 20, and outputs this control signal to the projector 20. Here, the quality of the video is uniformity, luminance (brightness adjustment), resolution, and the like of the video.

2-5. Processing of Projection System

Next, the processing executed by the projection system 1 will be described.

Figure 5:
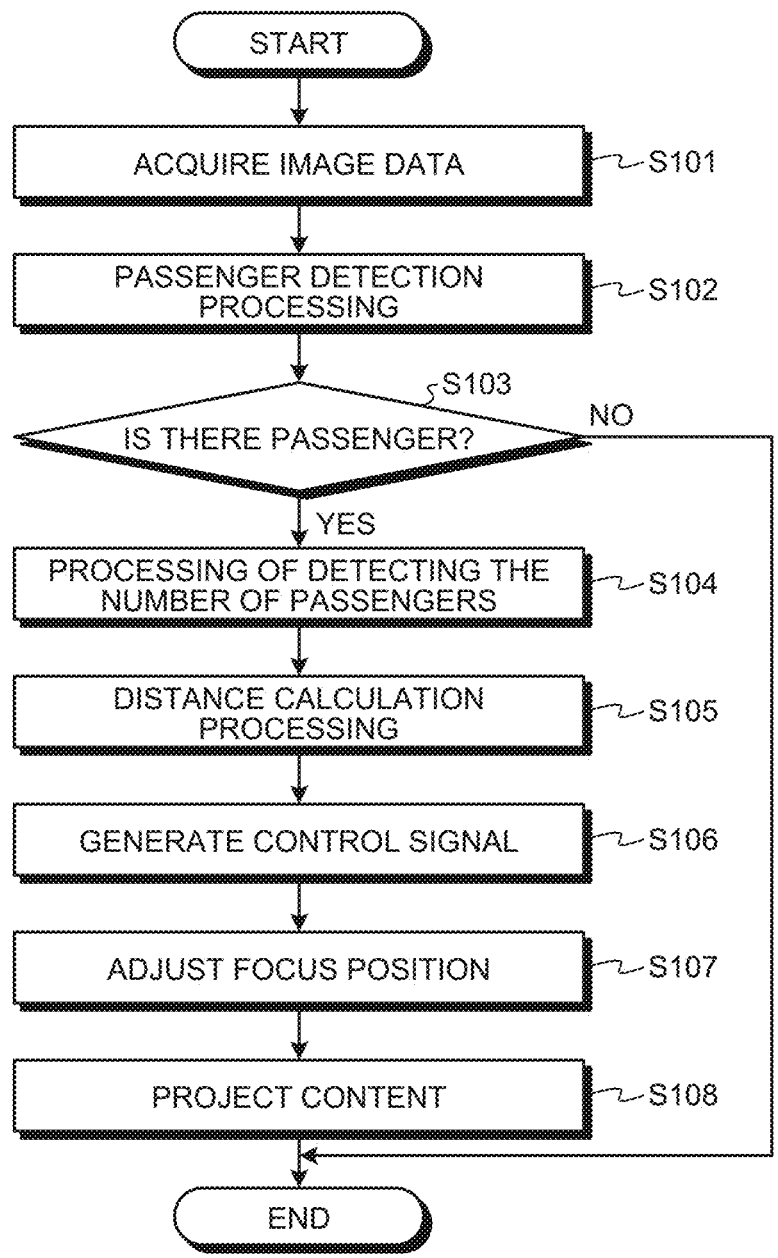
FIG. 5 is a flowchart illustrating an outline of processing executed by the projection system according to the first embodiment.

FIG. 5 is a flowchart illustrating an outline of processing executed by the projection system 1.

As illustrated in FIG. 5, first, the input unit 51 acquires color image data (RGB color image data) from the camera 31 (step S101).

Subsequently, the recognition unit 521 performs passenger detection processing of detecting a passenger of the moving body 10 on the image data input from the input unit 51 (step S102), and in a case where there is a passenger in the moving body 10 (step S103: Yes), the projection system 1 proceeds to step S104 described later. On the other hand, when there is no passenger in the moving body 10 (step S103: No), the projection system 1 ends the present processing.

In step S104, the recognition unit 521 performs processing of detecting the number of passengers of the moving body 10 on the basis of a detection result obtained by performing passenger detection processing of detecting the passenger of the moving body 10 on the image data input from the input unit 51. In this case, other than the number of passengers, the recognition unit 521 detects the seating position of the passenger in the moving body 10 (the absolute position of the passenger or the relative position of each passenger for each seat) and the viewpoint position of each passenger (the center position of the head or the position of the eye).

Subsequently, the calculation unit 523 performs distance calculation processing of calculating, for each passenger, the distance between the seating position of the passenger recognized by the recognition unit 521 and the projection plane of the video projected by the projector 20 stored in the memory 522 (step S105).

Thereafter, the generation unit 524 generates a control signal for controlling the focus state of the video projected by the projector 20 on the basis of the recognition result input from the recognition unit 521 and the calculation result input from the calculation unit 523 (step S106).

Subsequently, on the basis of a control signal input from the control device 50, by controlling the drive driver 25 and driving the optical device drive unit 26 to move the projection lens 24 on the optical path L1, the projector control unit 27 adjusts the focus position of the video to be projected onto the projection plane by the projector 20 (step S107).

Figure 6:
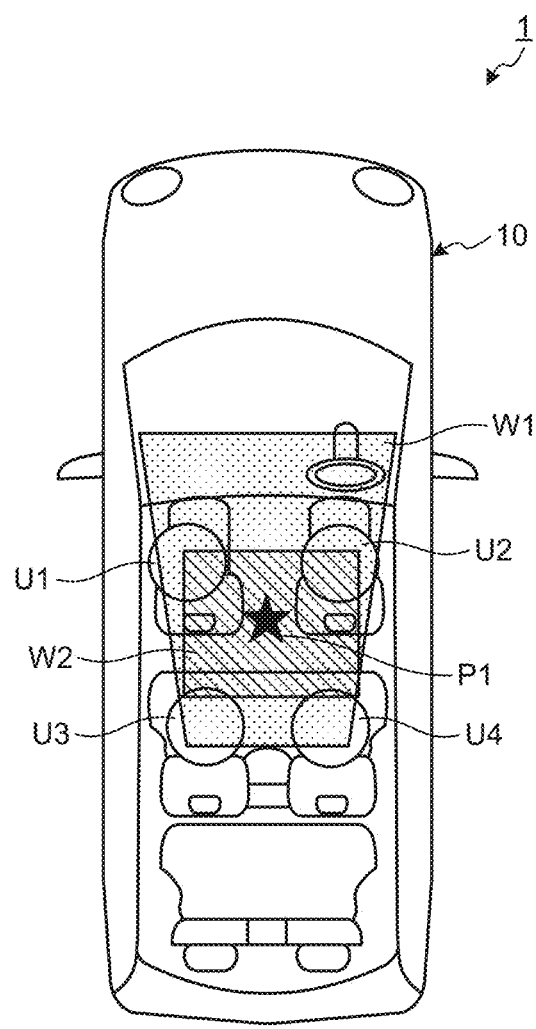
FIG. 6 is a view schematically illustrating a focus position of a projector in a case where there are four passengers in a moving body.

FIG. 6 is a view schematically illustrating the focus position of the projector 20 in a case where there are four passengers in the moving body 10.

As illustrated in FIG. 6, on the basis of a control signal input from the control device 50, by controlling the drive driver 25 and driving the optical device drive unit 26, the projector control unit 27 moves the projection lens 24 on the optical path L1 so that the focus position P1 (focus position) is aligned with a region where the lines of sight of the four passengers U1 to U4 gather, which is a region of a central part of the projection plane W1 (projection range) projected by the projector 20. Furthermore, the projector control unit 27 controls the display driver 21 on the basis of the control signal input from the control device 50 and drives the display device 22, thereby improving the quality of the video of a region W2 where the lines of sight of the four passengers U1 to U4 further gather in the projection plane W1. This allows the four passengers U1 to U4 to view the focused video.

Figure 7:
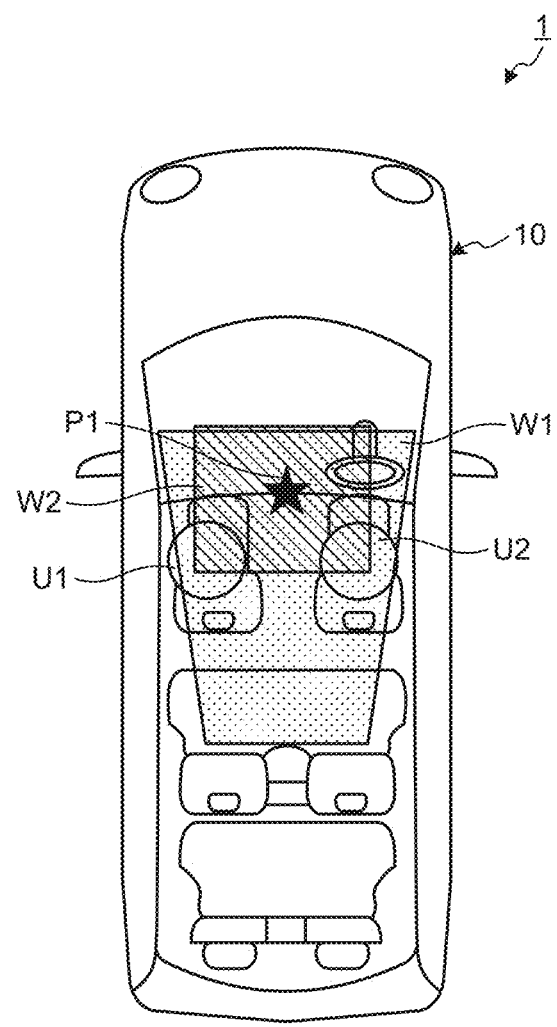
FIG. 7 is a view schematically illustrating a focus position of a projector in a case where there are two passengers on a front seat in a moving body.

FIG. 7 is a view schematically illustrating the focus position of the projector 20 in a case where there are two passengers on the front seat 12 in the moving body 10.

As illustrated in FIG. 7, on the basis of a control input from the control device 50, by controlling the drive driver 25 and driving the optical device drive unit 26, the projector control unit 27 moves the projection lens 24 on the optical path L1 so that the focus position P1 is aligned with a region where the lines of sight of the two passengers U1 and U2 seated on the front seat 12 gather, which is a central region on the front side of the projection plane W1 (projection range) projected by the projector 20. Furthermore, the projector control unit 27 controls the display driver 21 on the basis of the control signal input from the control device 50 and drives the display device 22, thereby improving the quality of the video of a region W2 where the lines of sight of the two passengers U1 and U2 further gather in the projection plane W1. This allows the two passengers U1 and U2 to view the focused video.

Figure 8:
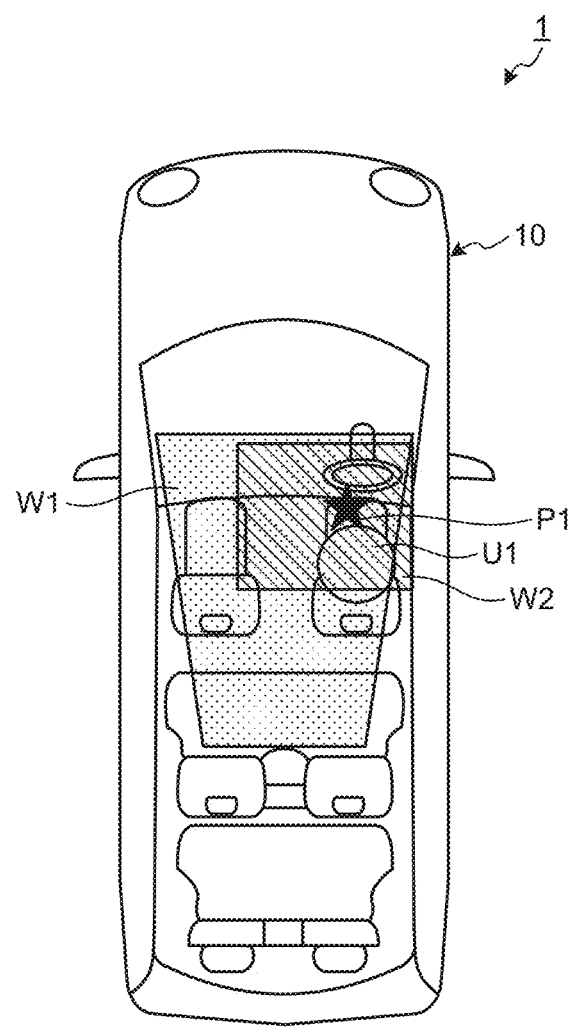
FIG. 8 is a view schematically illustrating a focus position of a projector in a case where there is one person in a front seat in a moving body.

FIG. 8 is a view schematically illustrating the focus position of the projector 20 in a case where there is one person in the front seat 12 in the moving body 10.

As illustrated in FIG. 8, on the basis of a control signal input from the control device 50, by controlling the drive driver 25 and driving the optical device drive unit 26, the projector control unit 27 moves the projection lens 24 on the optical path L1 so that the focus position P1 is aligned with a region of the line of sight of the passenger U1 seated on the front seat 12, which is a right region on the front side of the central part of the projection plane W1 (projection range) projected by the projector 20. Furthermore, the projector control unit 27 controls the display driver 21 on the basis of the control signal input from the control device 50 and drives the display device 22, thereby improving the quality of the video of a region W2 where the line of sight of the passenger U1 further gathers in the projection plane W1. This allows the passenger U1 to view the focused video.

Figure 9:
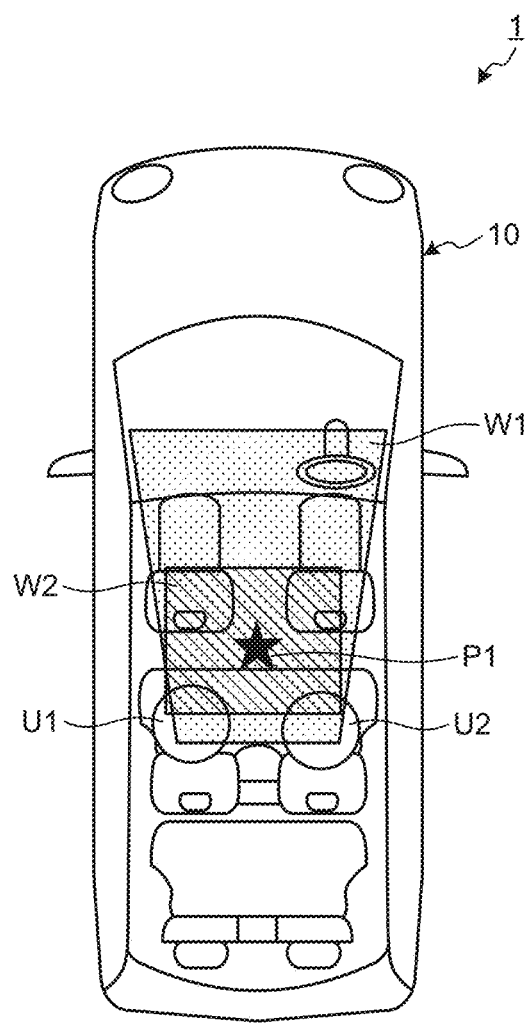
FIG. 9 is a view schematically illustrating a focus position of a projector in a case where there are two persons on a rear seat in a moving body.

FIG. 9 is a view schematically illustrating the focus position of the projector 20 in a case where there are two people in the rear seat 13 in the moving body 10.

As illustrated in FIG. 9, on the basis of a control signal input from the control device 50, by controlling the drive driver 25 and driving the optical device drive unit 26, the projector control unit 27 moves the projection lens 24 on the optical path 11 so that the focus position P1 is aligned with a region where the lines of sight of the two passengers U1 and U2 seated on the rear seat 13 gather, which is a region on the rear side relative to the central part of the projection plane W1 (projection range) projected by the projector 20. Furthermore, the projector control unit 27 controls the display driver 21 on the basis of the control signal input from the control device 50 and drives the display device 22, thereby improving the quality of the video of a region W2 where the lines of sight of the two passengers U1 and U2 in the rear seat 13 further gather in the projection plane W1. This allows the passenger to view the focused video.

Figure 10:
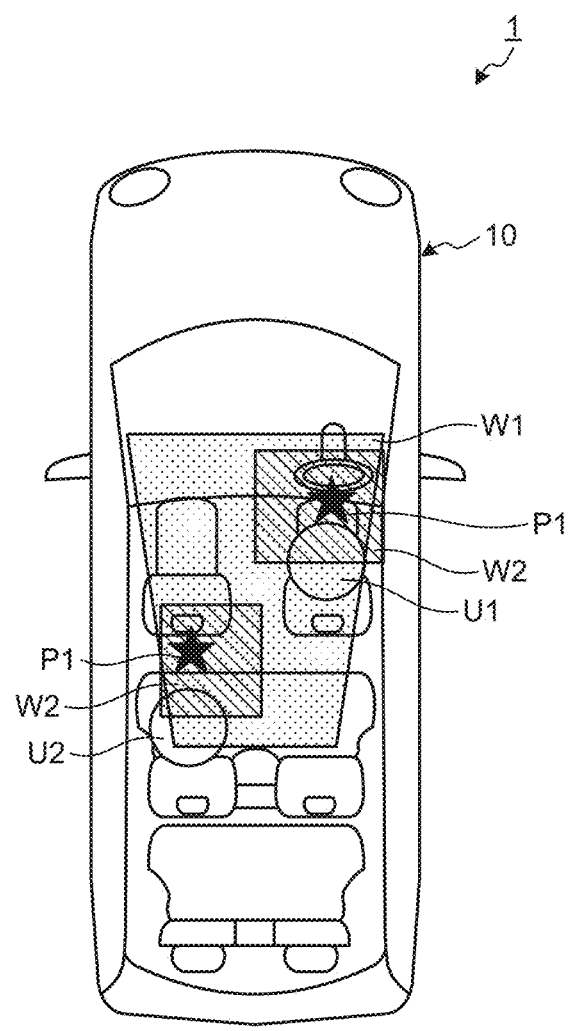
FIG. 10 is a view schematically illustrating focus positions of a projector in a case where there are two persons in front and rear in a moving body.

FIG. 10 is a view schematically illustrating the focus positions of the projector 20 in a case where there are two persons in front and rear the moving body 10.

As illustrated in FIG. 10, on the basis of a control signal input from the control device 50, by controlling the drive driver 25 and driving the optical device drive unit 26, the projector control unit 27 moves the projection lens 24 on the optical path L1 so that the focus position P1 is aligned with a region where the lines of sight of the two passengers U1 and U2 seated on the front seat 12 and the rear side 13 gather, which is a region on the rear side or the front side of the projection plane W1 (projection range) projected by the projector 20. Furthermore, the projector control unit 27 controls the display driver 21 on the basis of the control signal input from the control device 50 and drives the display device 22, thereby improving the quality of the video of a region W2 where the lines of sight of the two passengers U1 and U2 in the front seat 12 and the rear seat 13 further gather in the projection plane W1. This allows the two passengers to view the focused video. Note that in a case where the projection lens 24 is configured using a tilt lens (tilt shift lens capable of tilt), the projector control unit 27 is only required to adjust the focus position of the video projected by the projector 20 by directing the optical axis of the projection lens 24 in any of a tilt direction, a tilt direction, and a shift direction by driving the optical device drive unit 26.

Figure 11:
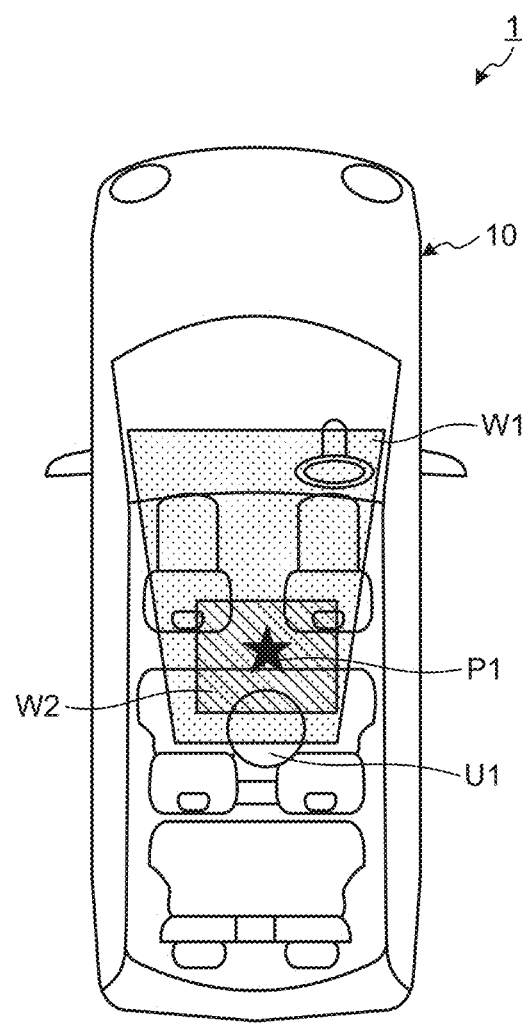
FIG. 11 is a view schematically illustrating a focus position of a projector in a case where there is one person in a rear seat in a moving body.

FIG. 11 is a view schematically illustrating the focus position of the projector 20 in a case where there is one person in the rear seat 13 in the moving body 10.

As illustrated in FIG. 11, on the basis of a control signal input from the control device 50, by controlling the drive driver 25 and driving the optical device drive unit 26, the projector control unit 27 moves the projection lens 24 on the optical path L1 so that the focus position P1 is aligned with a region where the line of sight of the passenger U1 seated on the rear side 13 gathers which is a central region of the central part on the rear side relative to the central part of the projection plane W1 (projection range) projected by the projector 20. Furthermore, the projector control unit 27 controls the display driver 21 on the basis of the control signal input from the control device 50 and drives the display device 22, thereby improving the quality of the video of a region W2 where the line of sight of the passenger U1 further gathers in the projection plane W1. This allows the passenger U1 to view the focused video.

Returning to FIG. 5, the description of step S108 and subsequent steps will be continued.

In step S108, on the basis of the content data input from the content reproduction device 40, the projector control unit 27 controls the display driver 21 and causes the display device 22 to project video corresponding to the content data. After step S108, the projection system 1 ends the present processing.

2-6. Actions and Effects

According co the first embodiment described above, the control unit 52 controls the state of video projected onto the predetermined projection plane by the projector 20 provided in a space in the moving body 10 on the basis of the space situation information input from the sensor unit 30 that detects the space situation in the moving body 10. This allows the passenger in the moving body 10 to visually recognize the most appropriate video.

According to the first embodiment, since the recognition unit 521 recognizes the number and the seating positions of passengers in the moving body 10 on the basis of the space situation information, and the generation unit 524 generates a control signal for controlling the focus state of the video projected by the projector 20 on the basis of the number of people and the seating position recognized by the recognition unit 521, it is possible to provide video focused on the passenger in the moving body 10.

According to the first embodiment, since the generation unit 524 generates the control signal for controlling the focus state of the video projected by the projector 20 on the basis of the number of people recognized by the recognition unit 521, the seating positions, and the distance for each passenger calculated by the calculation unit 523, it is possible to provide video focused on the passenger in the moving body 10.

According to the first embodiment, since the calculation unit 523 calculates the distance for each passenger on the basis of at least one of the head position and the eye position of the passenger and the seating position, it is possible to calculate the distance to an accurate focus position suitable for the passenger.

According to the first embodiment, since the generation unit 524 generates the control signal for controlling the focus position of the projector 20 and outputs the control signal to the projector 20, it is possible to provide video focused on the passenger in the moving body 10.

According to the first embodiment, since the generation unit 524 generates the control signal for adjusting the brightness of the video projected by the projector 20 and outputs the control signal to the projector 20, it is possible to provide most appropriate video to the passenger in the moving body 10.

3. Second Embodiment

Next, the second embodiment will be described. The projection system according to the second embodiment is different in the configurations of the sensor unit 30 and the control device 50 of the projection system 1 according to the first embodiment described above. Hereinafter, the projection system according to the second embodiment will be described. Note that the same components as those of the first embodiment described above are denoted by the same reference signs, and detailed description will be omitted.

3-1. Functional Configuration of Projection System

Figure 12:
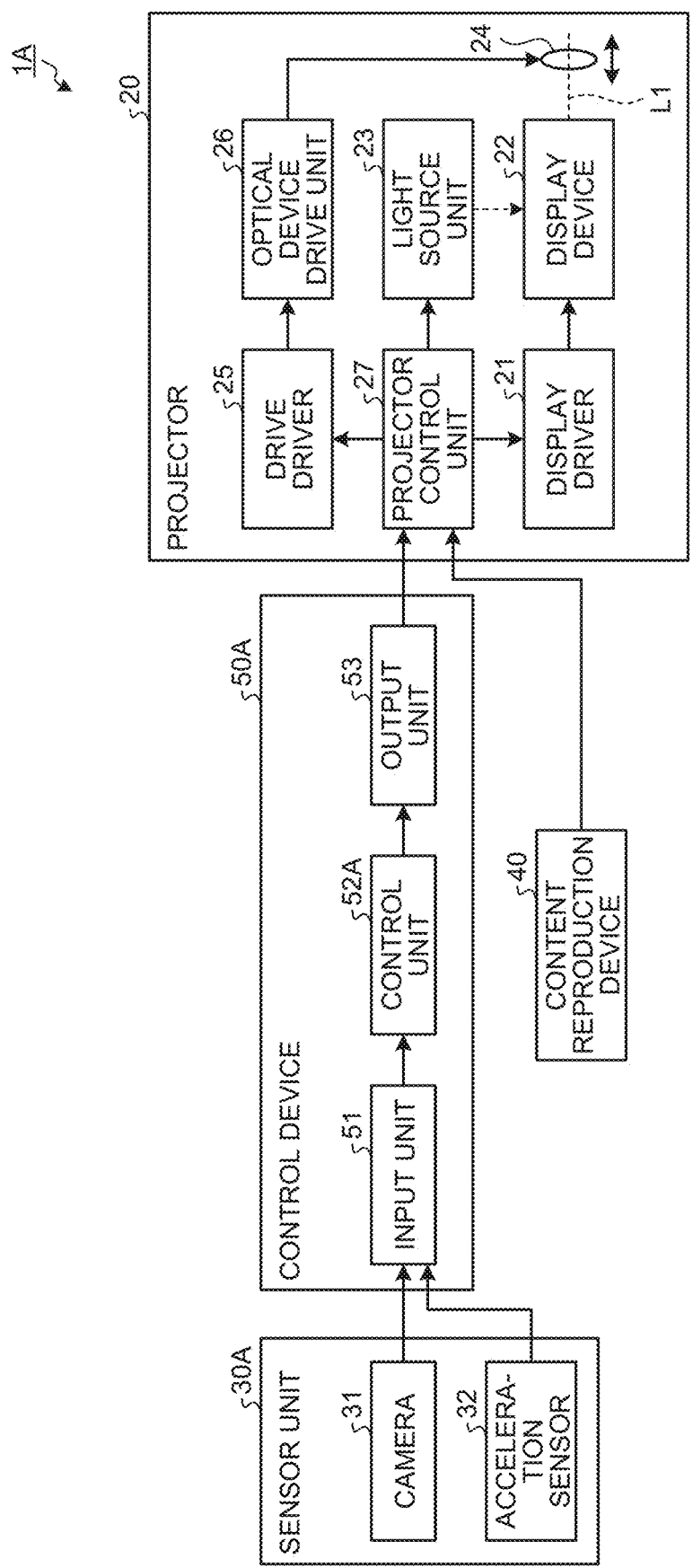
FIG. 12 is a block diagram illustrating a functional configuration of a projection system according to a second embodiment.

FIG. 12 is a block diagram illustrating a functional configuration of the projection system according to the second embodiment.

A projection system 1A illustrated in FIG. 12 includes a sensor unit 30A and a control device 50A instead of the sensor unit 30 and the control device 50 according to the first embodiment described above.

3-2. Configuration of Sensor Unit

First, the configuration of the sensor unit 30A will be described.

The sensor unit 30A further includes an acceleration sensor 32 in addition to the configuration of the sensor unit 30 according to the first embodiment described above.

The acceleration sensor 32 detects acceleration information generated in the moving body 10 and outputs this acceleration information to the control device 50. Specifically, the acceleration sensor 32 detects acceleration of three axes (X-axis, Y-axis, and Z-axis) of the moving body 10 as shake generated in the moving body 10. Note that a gyro sensor (angular velocity sensor) may be further provided in addition to the acceleration sensor 32.

3-3. Configuration of Control Device

Next, the configuration of the control device 50A will be described.

The control device 50A includes a control unit 52A instead of the control unit 52 according to the first embodiment described above.

On the basis of image data from the camera 31 and acceleration information from the acceleration sensor 32, the control unit 52 generates a control signal for controlling the state of the video projected by the projector 20, and outputs this control signal to the output unit 53.

3-3-1. Functional Configuration of Control Unit

Next, the detailed functional configuration of the control unit 52 will be described.

Figure 13:
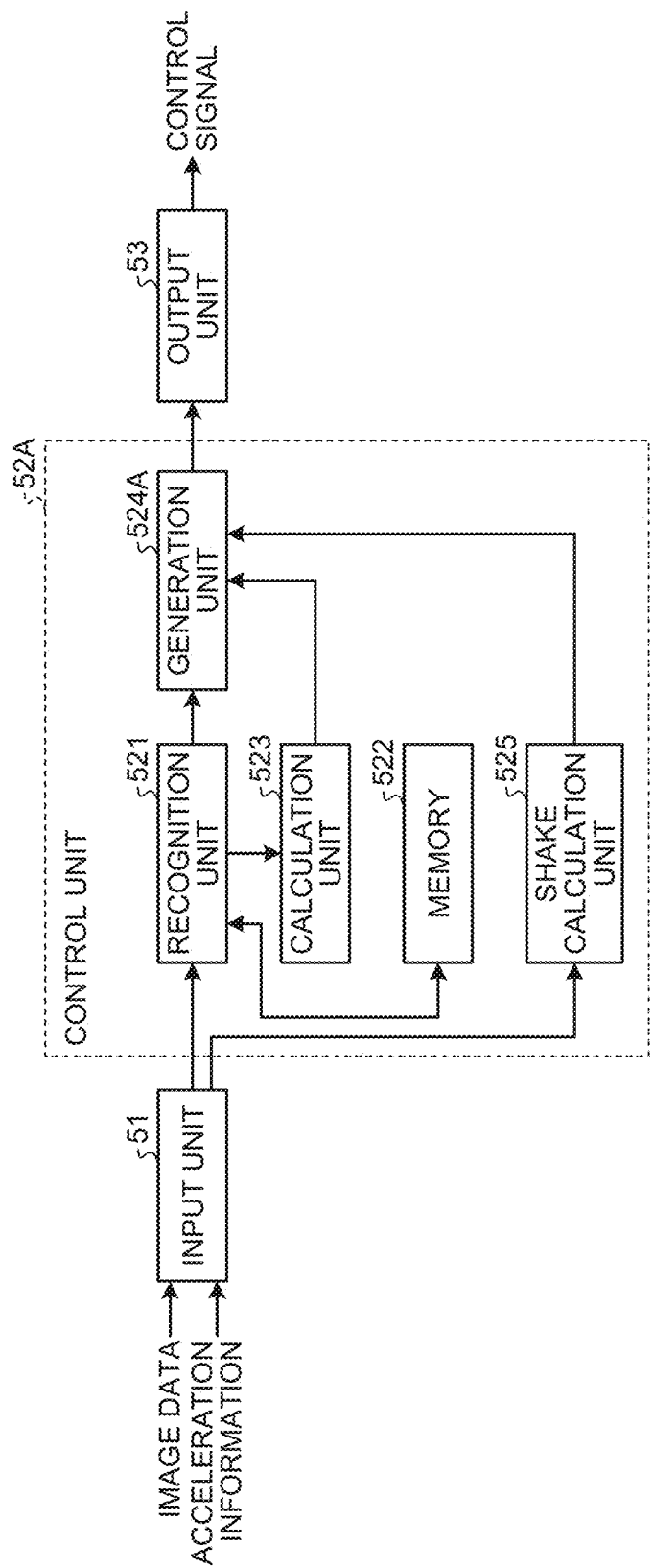
FIG. 13 is a block diagram illustrating a detailed functional configuration of a control unit according to the second embodiment.

FIG. 13 is a block diagram illustrating a detailed functional configuration of the control unit 52A.

The control unit 52A illustrated in FIG. 13 further includes a shake calculation unit 525 in addition to the configuration of the control unit 52 according to the first embodiment described above. Furthermore, the control unit 52A includes a generation unit 524A instead of the generation unit 524 according to the first embodiment described above.

On the basis of the acceleration information input from the acceleration sensor 32 via the input unit 51, the shake calculation unit 525 calculates shake generated in the moving body 10, and outputs this calculation result to the generation unit 524A.

The generation unit 524A generates a control signal for controlling the focus state of the projector 20 on the basis of the recognition result of the recognition unit 521, the calculation result of the calculation unit 523, and the calculation result of the shake calculation unit 525. The generation unit 524A outputs a control signal to the projector 20 via the output unit 53.

3-4. Processing of Projection System

Next, the processing executed by the projection system 1A will be described.

Figure 14:
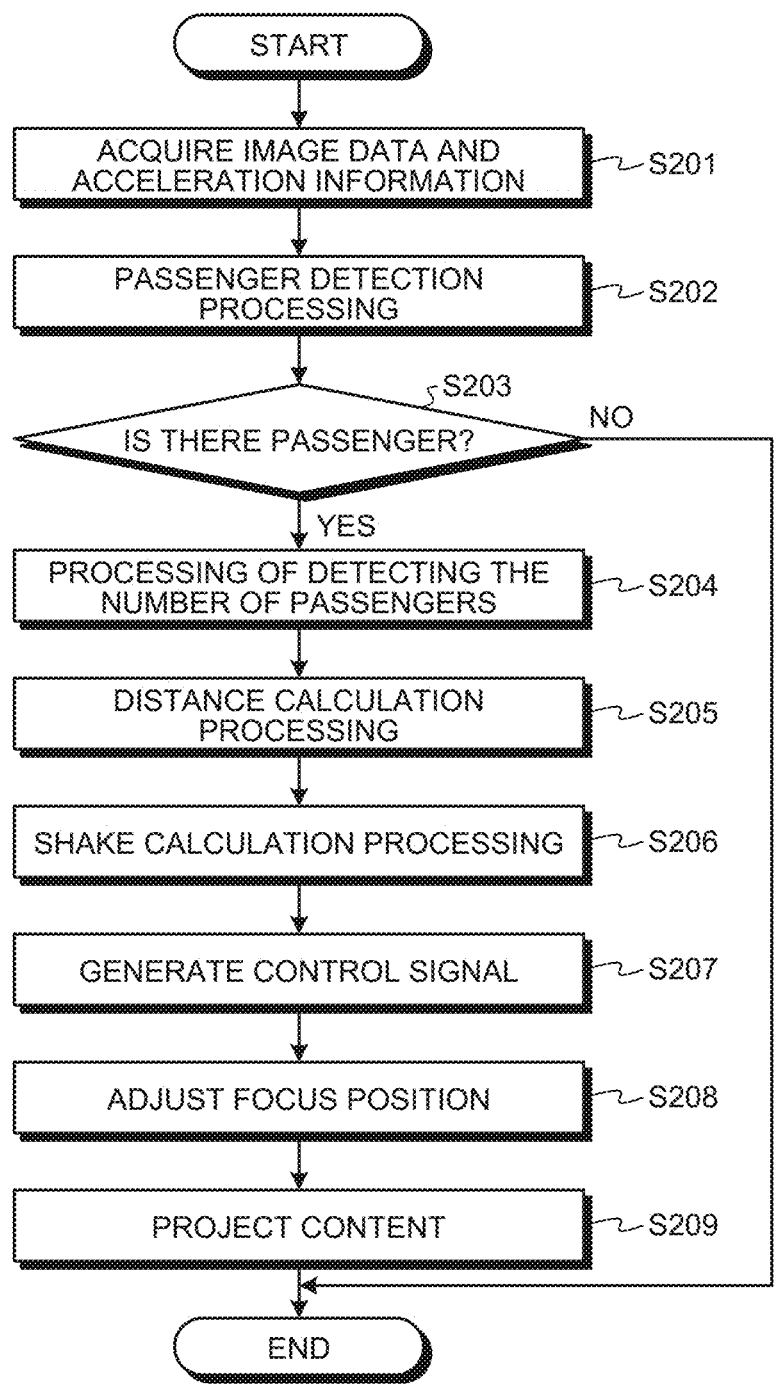
FIG. 14 is a flowchart illustrating an outline of processing executed by the projection system according to the second embodiment.

FIG. 14 is a flowchart illustrating an outline of processing executed by the projection system 1A.

As illustrated in FIG. 14, first, the input unit 51 acquires image data from the camera 31 and acceleration information from the acceleration sensor 32 (step S201).

Steps S202 to S205 correspond to steps S102 to S105 described above, respectively.

In step S206, the shake calculation unit 525 calculates shake generated in the moving body 10 on the basis of the acceleration information input from the acceleration sensor 32 via the input unit 51.

Subsequently, the generation unit 524 generates a control signal for controlling the focus state of the projector 20 on the basis of the recognition result of the recognition unit 521, the calculation result of the calculation unit 523, and the calculation result of the shake calculation unit 525 (step S207).

Steps S208 and S209 correspond to steps S207 and S208 described above, respectively. After step S208, the projection system 1A ends the present processing.

3-5. Actions and Effects

According to the second embodiment described above, on the basis of the number of people recognized by the recognition unit 521, the seating position, and the shake generated in the moving body 10 calculated by the shake calculation unit 525, the generation unit 524A generates the control signal and outputs the control signal to the projector 20. Therefore, since the projection state of video can be adjusted following shake of the moving body 10 and shake of the passenger, it is possible to provide video focused on the passenger in the moving body 10 even if the environment or the state changes.

4. Third Embodiment

Next, the third embodiment will be described. The third embodiment is different in the configurations of the sensor unit 30 and the control device 50 according to the first embodiment described above. Hereinafter, the projection system according to the third embodiment will be described. Note that the same components as those of the first embodiment described above are denoted by the same reference signs, and detailed description will be omitted.

4-1. Functional Configuration of Projection System

Figure 15:
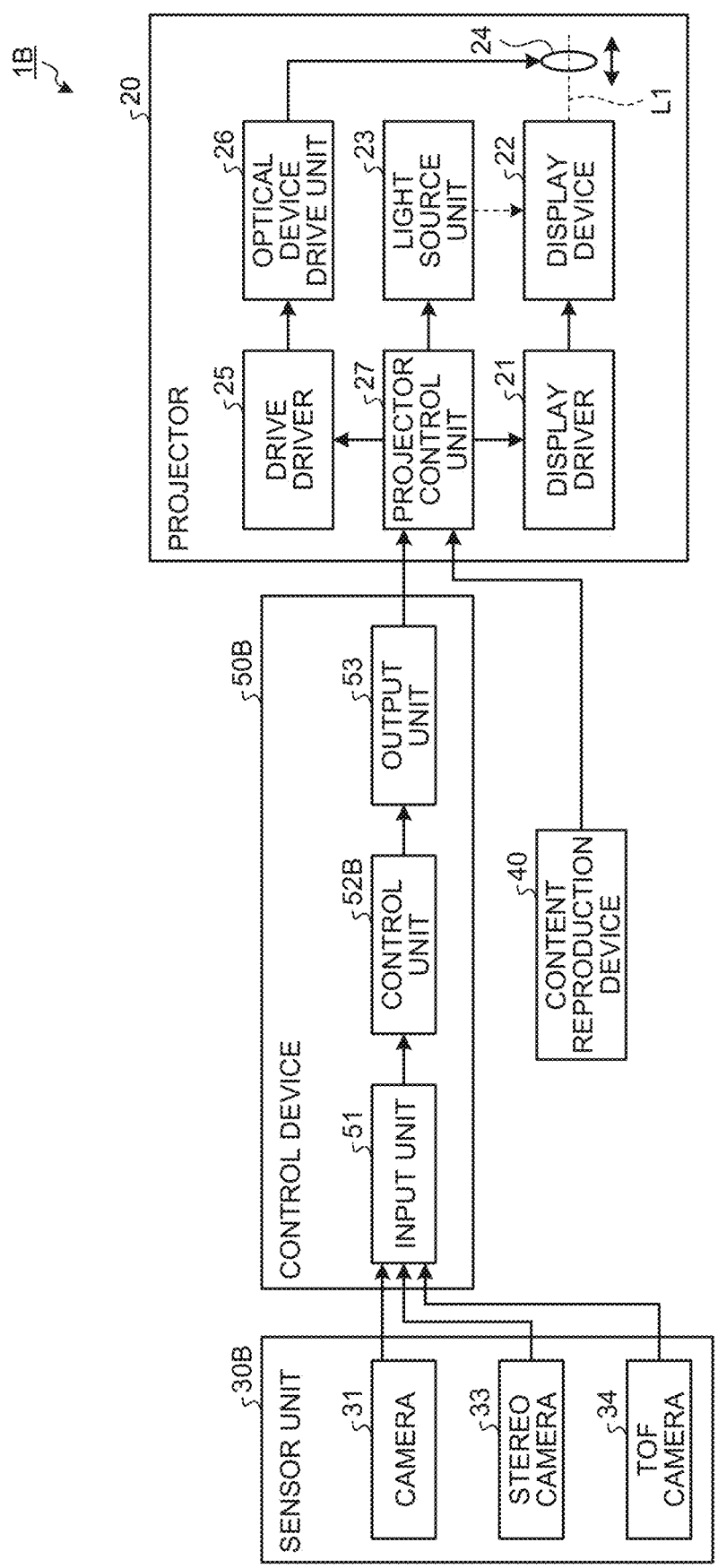
FIG. 15 is a block diagram illustrating a functional configuration of a projection system according to a third embodiment.

FIG. 15 is a block diagram illustrating a functional configuration of the projection system according to the third embodiment.

A projection system 1B illustrated in FIG. 15 includes a sensor unit 30B and a control device 50B instead of the sensor unit 30 and the control device 50 according to the first embodiment described above.

4-2. Configuration of Sensor Unit

First, the sensor unit 30B will be described.

The sensor unit 30B further includes a stereo camera 33 and a TOF camera 34 in addition to the configuration of the sensor unit 30 according to the first embodiment described above.

The stereo camera 33 generates stereo image data having parallax, and outputs this stereo image data to the control device 50B. The stereo camera 33 is achieved by using two optical systems having parallax and two image sensors such as a CCD or a CMOS that receive a subject image formed by each of the two optical systems.

By imaging the inside of the moving body 10, the TOF camera 34 generates distance image data (depth image) having distance information in which depth information is represented by a gray value for each pixel. The TOF camera 34 the TOF camera 34 is achieved by using a light source capable of emitting infrared light, and an imaging element such as a CCD or a CMOS capable of imaging infrared light reflected by an object, and the like.

4-3. Configuration of Control Device

Next, the configuration of the control device 50 will be described.

The control device 50B includes a control unit 52B instead of the control unit 52 according to the first embodiment described above.

On the basis of the image data, the stereo image data, and the depth information image data via the input unit 51, the control unit 52 generates a control signal for controlling the state of the video projected by the projector 20, and outputs this control signal to the output unit 53.

4-3-1. Functional Configuration of Control Unit

Next, the detailed functional configuration of the control unit 52 will be described.

Figure 16:
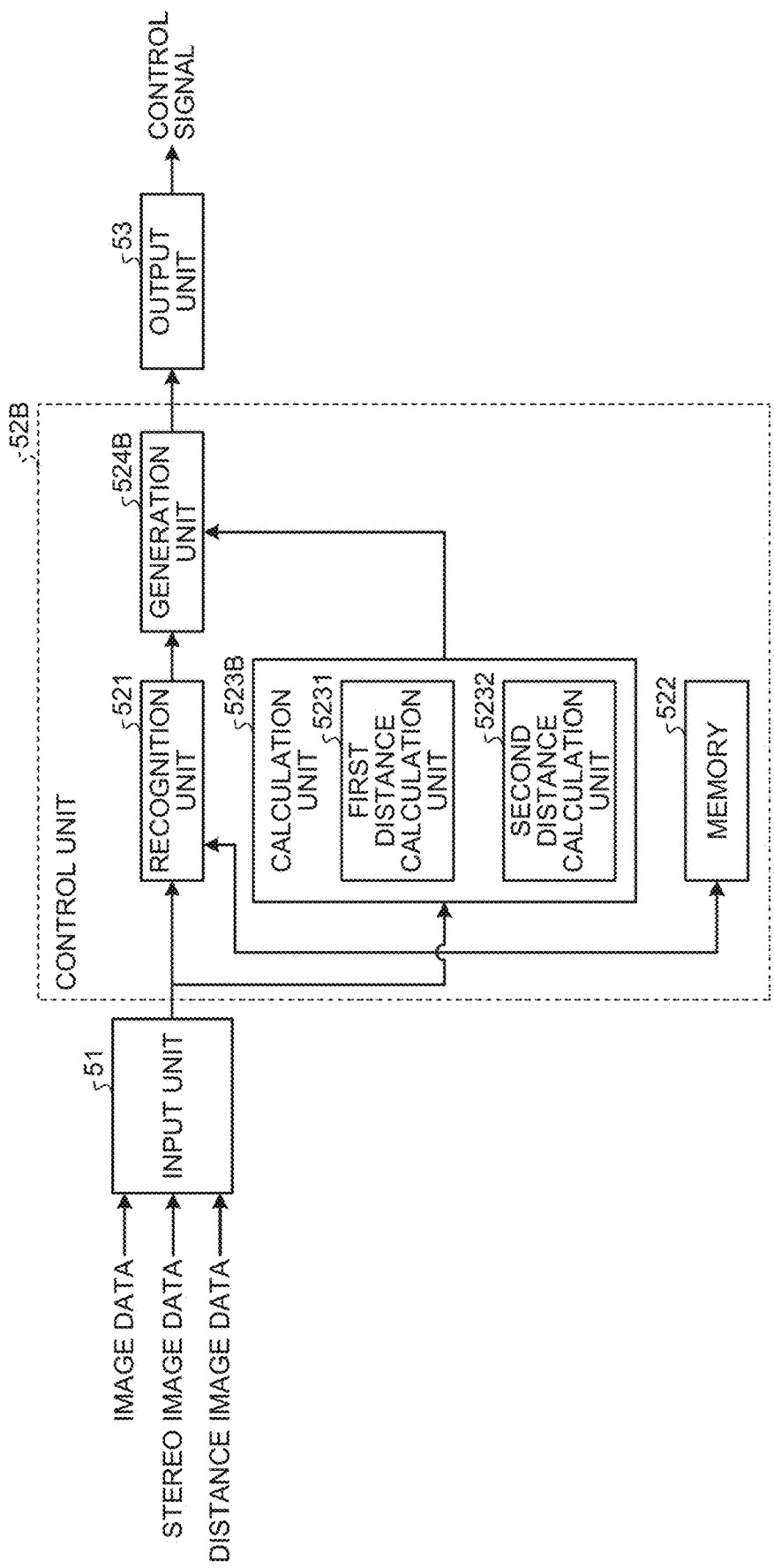
FIG. 16 is a block diagram illustrating a detailed functional configuration of a control unit according to the third embodiment.

FIG. 16 is a block diagram illustrating a detailed functional configuration of the control unit 52B.

The control unit 52B includes a calculation unit 523B instead of the calculation unit 523 of the first embodiment described above.

The calculation unit 523B includes a first distance calculation unit 5231 and a second distance calculation unit 5232.

On the basis of the stereo image data input via the input unit 51, the first distance calculation unit 5231 calculates the distance between the passenger seated at a short distance and the projection plane of the video projected by the projector 20, and outputs this calculation result to a generation unit 524B. Furthermore, the first distance calculation unit 5231 calculates the shape of the projection plane onto which the projector 20 projects the video and the distance for each predetermined region, and outputs this calculation result to the generation unit 524B.

On the basis of the distance image data input via the input unit 51, the second distance calculation unit 5232 calculates the distance between the passenger seated at a long distance and the projection plane of the video projected by the projector 20, and outputs this calculation result to a generation unit 524B. Furthermore, the second distance calculation unit 5232 calculates the shape of the projection plane onto which the projector 20 projects the video and the distance for each predetermined region, and outputs this calculation result to the generation unit 524B.

On the basis of the recognition result input from the recognition unit 521 and the calculation results input from each of the first distance calculation unit 5231 and the second distance calculation unit 5232, the generation unit 524 generates a control signal for controlling the focus state of the video projected by the projector 20, and outputs this control signal to the projector 20. Specifically, the generation unit 524 generates a control signal for controlling the focus state of the video projected by the projector 20 on the basis of the distance of each region on the projection plane projected by the projector 20 input from each of the first distance calculation unit 5231 and the second distance calculation unit 5232 and the recognition result input from the recognition unit 521.

4-4. Processing of Projection System

Figure 17:
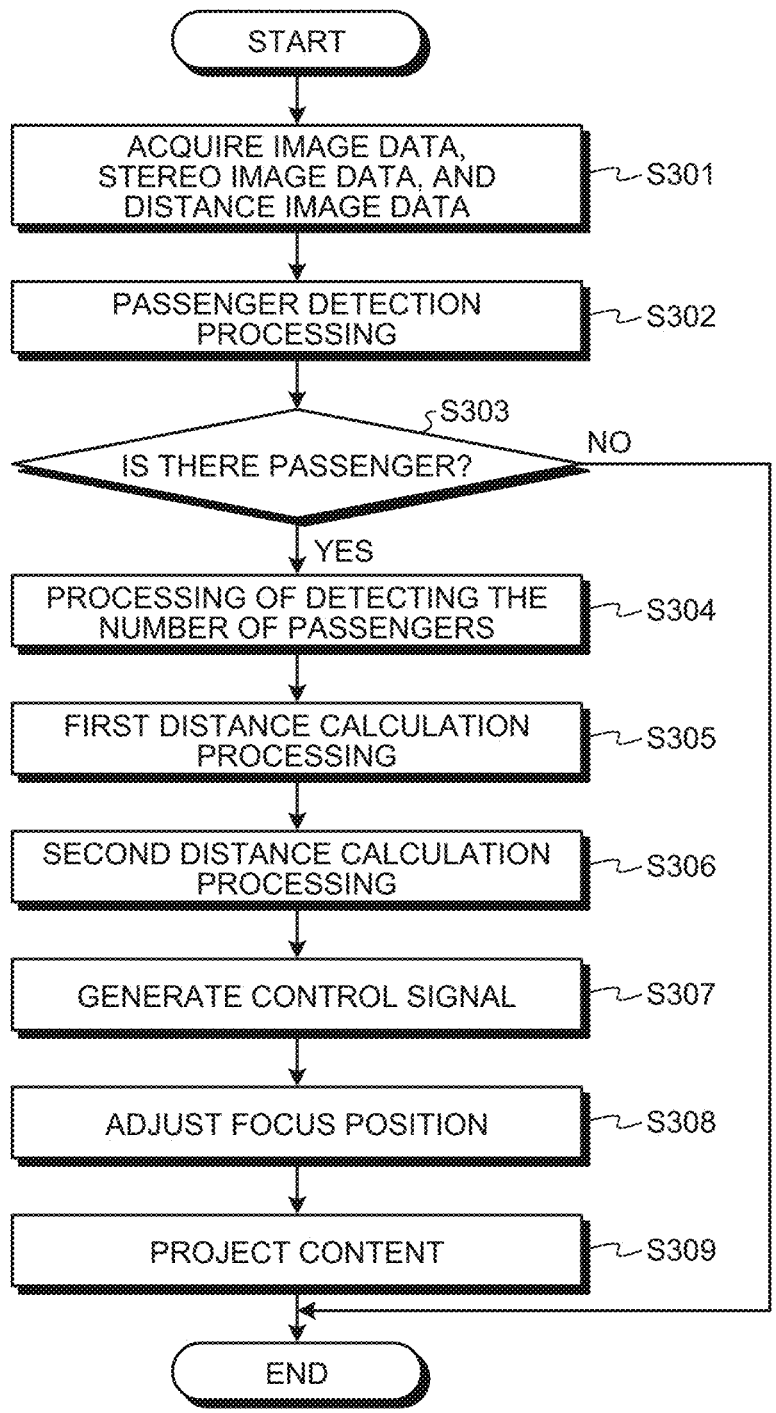
FIG. 17 is a flowchart illustrating an outline of processing executed by the projection system according to the third embodiment.

Next, the processing executed by the projection system 1B will be described. FIG. 17 is a flowchart illustrating an outline of processing executed by the projection system 1B.

As illustrated in FIG. 17, first, the input unit 51 acquires image data, stereo image data, and depth information image data from the sensor unit 30B (step S301).

Steps S302 to S304 correspond to steps S102 to S104 described above, respectively.

In step S305, the first distance calculation unit 5231 performs first distance calculation processing of calculating the distance between the passenger seated at a short distance and the projection plane of the video projected by the projector 20 on the basis of the stereo image data input via the input unit 51.

Subsequently, the second distance calculation unit 5232 performs second distance calculation processing of calculating the distance between the passenger seated at a long distance and the projection plane of the video projected by the projector 20 on the basis of the distance image data input via the input unit 51 (step S306).

Thereafter, on the basis of the recognition result input from the recognition unit 521 and the calculation results input from each of the first distance calculation unit 5231 and the second distance calculation unit 5232, the generation unit 524 generates a control signal for controlling the focus state of the video projected by the projector 20 (step S307).

Steps S308 and S309 correspond to steps S107 and S108 described above, respectively.

4-5. Actions and Effects

According to the third embodiment described above, the generation unit 524 generates a control signal for controlling the focus state of the video projected by the projector 20 on the basis of the recognition result input from the recognition unit 521 and the calculation results input from each of the first distance calculation unit 5231 and the second distance calculation unit 5232. This allows the passenger in the moving body 10 to visually recognize video that is focused.

5. Fourth Embodiment

Next, the fourth embodiment will be described. The projection system according to the fourth embodiment is different in the configuration of the control device 50 according to the first embodiment described above. Hereinafter, the projection system according to the fourth embodiment will be described. Note that the same components as those of the first embodiment described above are denoted by the same reference signs, and detailed description will be omitted.

5-1. Functional Configuration of Projection System

Figure 18:
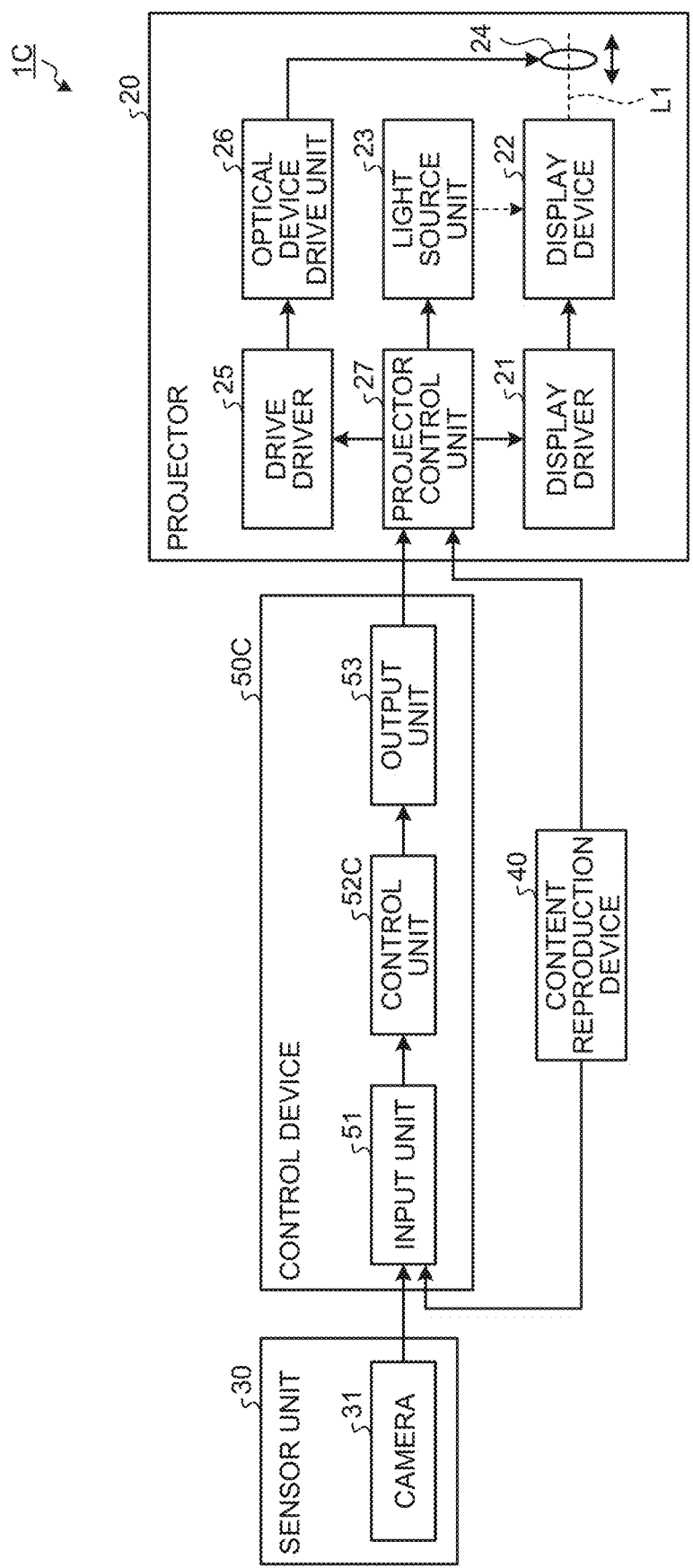
FIG. 18 is a block diagram illustrating a functional configuration of a projection system according to a fourth embodiment.

FIG. 18 is a block diagram illustrating a functional configuration of the projection system according to the fourth embodiment.

A projection system 1C illustrated in FIG. 18 includes a control device 50C instead of the control device 50 according to the first embodiment described above.

The control device 50C includes a control unit 52C instead of the control unit 52 of the control device 50 according to the first embodiment described above. The control unit 52 controls the focus state of the video projected by the projector 20 on the basis of the content data input from the content reproduction device 40.

5-2. Functional Configuration of Control Unit

Figure 19:
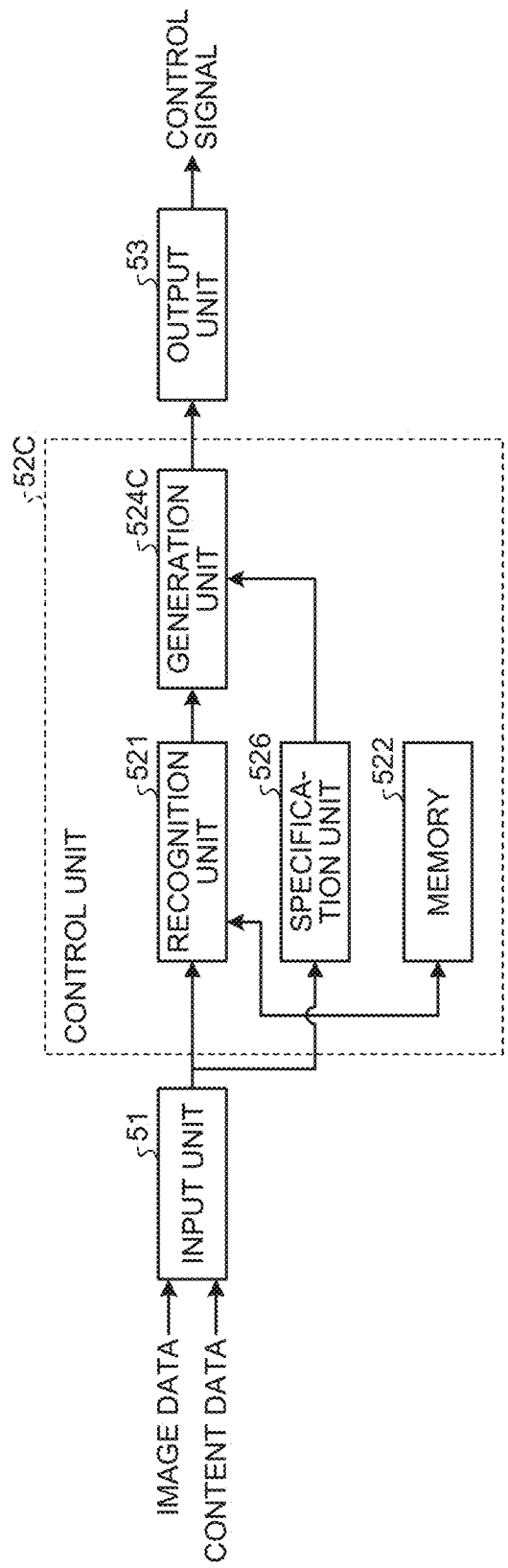
FIG. 19 is a block diagram illustrating a functional configuration of a control unit according to the fourth embodiment.

FIG. 19 is a block diagram illustrating the functional configuration of the control unit 52.

The control unit 52C illustrated in FIG. 19 includes a specification unit 526 instead of the calculation unit 523 of the control unit 52 according to the first embodiment described above. The control unit 52C further includes a generation unit 524C instead of generation unit 524.

On the basis of the content data via the input unit 51, the specification unit 526 specifies an emphasis position emphasized in the video projected by the projector 20, and outputs this specification result to the generation unit 524.

The generation unit 524 generates a control signal for controlling the focus state of the video projected by the projector 20 on the basis of the recognition result input from the recognition unit 521 and the specification result input from the specification unit 526. The generation unit 524C outputs a control signal to the projector 20 via the output unit 53.

5-3. Processing of Projection System

Next, the processing executed by the projection system 1C will be described.

Figure 20:
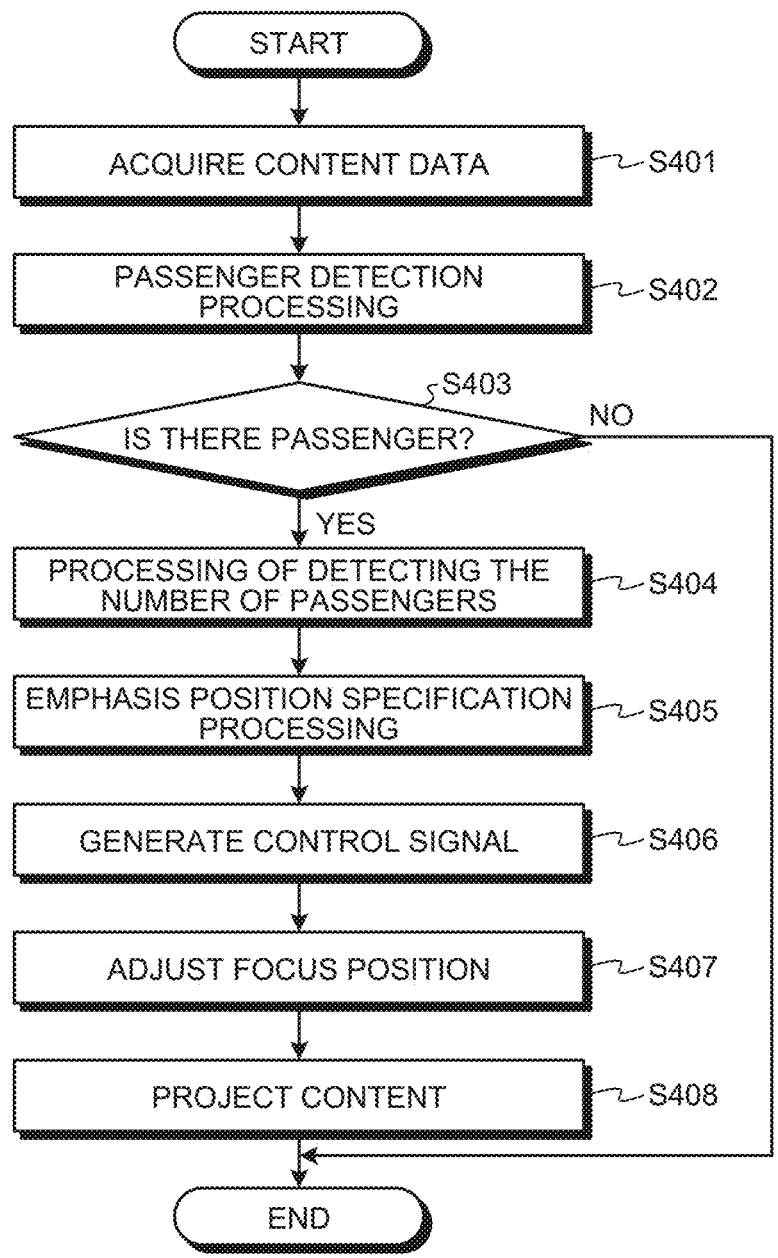
FIG. 20 is a flowchart illustrating an outline of processing executed by the projection system according to the fourth embodiment.

FIG. 20 is a flowchart illustrating an outline of processing executed by the projection system 1C.

In FIG. 20, first, the input unit 51 acquires image data from the camera 31 and content data from the content reproduction device 40 (step S401).

Steps S402 to S404 correspond to steps S102 to S104 described above, respectively.

In step S405, on the basis of content data via the input unit 51, the specification unit 526 performs emphasis position specification processing of specifying an emphasis position emphasized in the video projected by the projector 20, and outputting this specification result to the generation unit 524.

Subsequently, the generation unit 524 generates a control signal for controlling the focus state of the video projected by the projector 20 on the basis of the recognition result input from the recognition unit 521 and the specification result input from the specification unit 526 (step S406).

Figure 21:
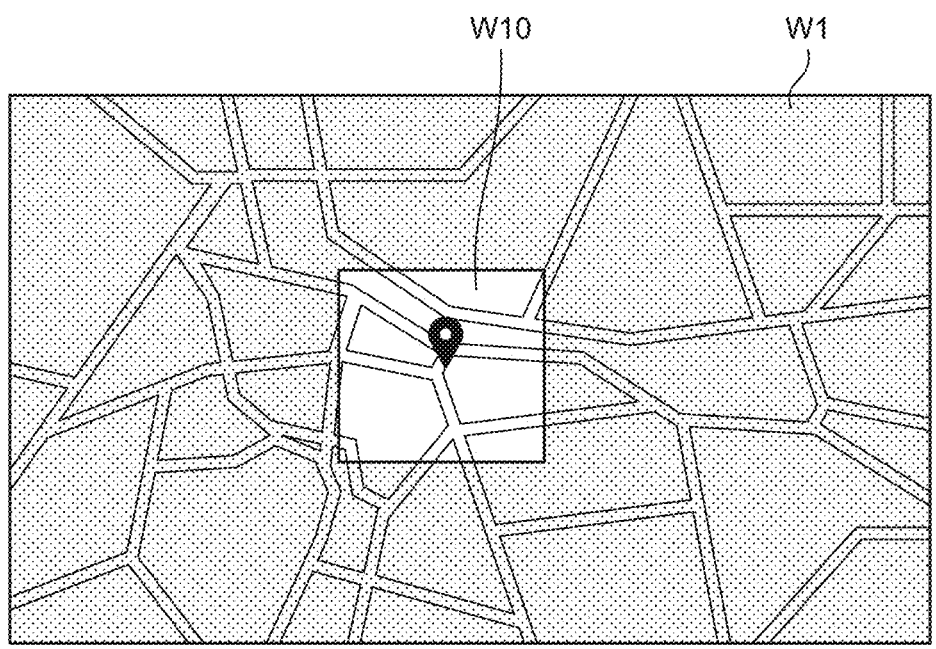
FIG. 21 is a view schematically illustrating a focus state of video projected by a projector based on a control signal generated by a generation unit.

FIG. 21 is a view schematically illustrating the focus state of video projected by projector 20 based on a control signal generated by the generation unit 524.

In the fourth embodiment, in a case where the projector 20 projects video (for example, a navigation image) onto the ceiling 11 of the moving body 10 at a short distance and on a large screen, the same thing is shared by all passengers, and therefore it is necessary for the passengers to have the same lines of sight. Therefore, in the fourth embodiment, by guiding the point viewed by the passengers, it is required for all the passengers to quickly view the same point. Furthermore, since the moving body 10 is constantly moving, it is required to cause the passengers to quickly share the moving object at that timing.

Therefore, as illustrated in FIG. 21, the generation unit 524C generates a control signal in which the focus state is on a region W10 including the emphasis position to be emphasized in the video of the projection plane W1 specified by the specification unit 526, and outputs this control signal to the projector 20. In this case, the generation unit 524C generates a control signal in which the focus position (focus position) of the projector 20 is aligned with the emphasis position to be emphasized in the video specified by the specification unit 526, and the focus is on from the focus position to the predetermined region W10. This allows all passengers in the moving body 10 to visually recognize the region W10 of the same video naturally.

Note that the generation unit 524C may generate a control signal for emphasizing more the resolution, contrast, brightness, and the like in the region W10 than those in other regions, in addition to the focus position, and output this control signal to the projector 20. Furthermore, in FIG. 21, the video is a navigation image such as a map, but is not limited to this, and may be, for example, peripheral information and emergency information of the moving body 10. In this case, the generation unit 524C may generate a control signal in which the focus position is aligned with the peripheral information and the emergency information in a superimposed image in which the peripheral information and the emergency information of the moving body 10 are superimposed on the video on the basis of the position information of the moving body 10. Of course, in FIG. 21, a navigation image such as a map has been described as an example, but the present invention is not limited to this, and for example, characters and figures may be used.

Steps S407 and 408 correspond to steps S107 and S108 described above, respectively.

5-4. Actions and Effects

According to the fourth embodiment described above, the generation unit 524 generates a control signal for controlling the focus state of the video projected by the projector 20 on the basis of the recognition result input from the recognition unit 521 and the specification result input from the specification unit 526. This makes it possible to quickly guide the line of sight of the passenger to an important region in the video, and it is possible to easily guide the line of sight to a gaze point on a large screen.

6. Fifth Embodiment

Next, the fifth embodiment will be described. The projection system according to the fifth embodiment is different in configuration from the sensor unit 30 and the control device 50 of the projection system 1 according to the first embodiment described above. Hereinafter, the projection system according to the fifth embodiment will be described. Note that the same components as those of the first embodiment described above are denoted by the same reference signs, and detailed description will be omitted.

6-1. Functional Configuration of Projection System

Figure 22:
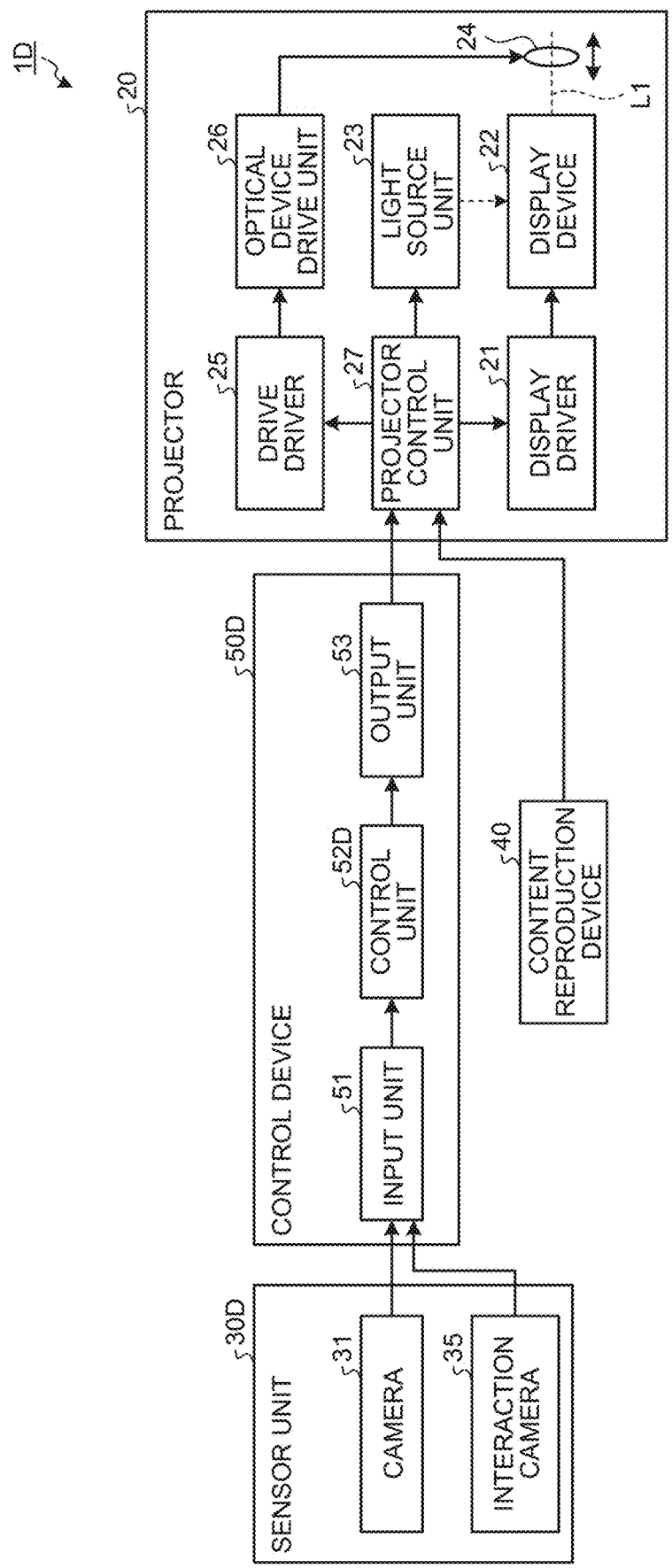
FIG. 22 is a block diagram illustrating a functional configuration of a projection system according to a fifth embodiment.

FIG. 22 is a block diagram illustrating a functional configuration of the projection system according to the fifth embodiment.

A projection system 1D illustrated in FIG. 22 includes a sensor unit 30D and a control device 50D instead of the sensor unit 30 and the control device 50 according to the first embodiment described above.

6-2. Configuration of Sensor Unit

First, the configuration of the sensor unit 30D will be described.

The sensor unit 30D includes the camera 31 and an interaction device 35.

The interaction device 35 is achieved by using a TOF camera or the like, detects gesture of the passenger, and outputs this detection result to the control device 50D. For example, the interaction device 35 detects the direction and the position pointed by the passenger with a finger, and outputs this detection result to the control device 50D. Note that the interaction device 35 may be achieved by using, for example, a stereo camera or the like other than the TOF camera.

6-3. Configuration of Control Device

Next, the configuration of the control device 50D will be described.

The control device 50D includes a control unit 52D instead of the control unit 52 of the control device 50 according to the first embodiment described above.

On the basis of the image data input from the camera 31 via the input unit 51 and the depth information image data input from the TOF camera 34, the control unit 52D generates a control signal for adjusting the focus state of the video projected by the projector 20, and outputs this control signal to the projector 20.

6-3-1. Functional Configuration of Control Unit

Next, the functional configuration of the control unit 52D will be described.

Figure 23:
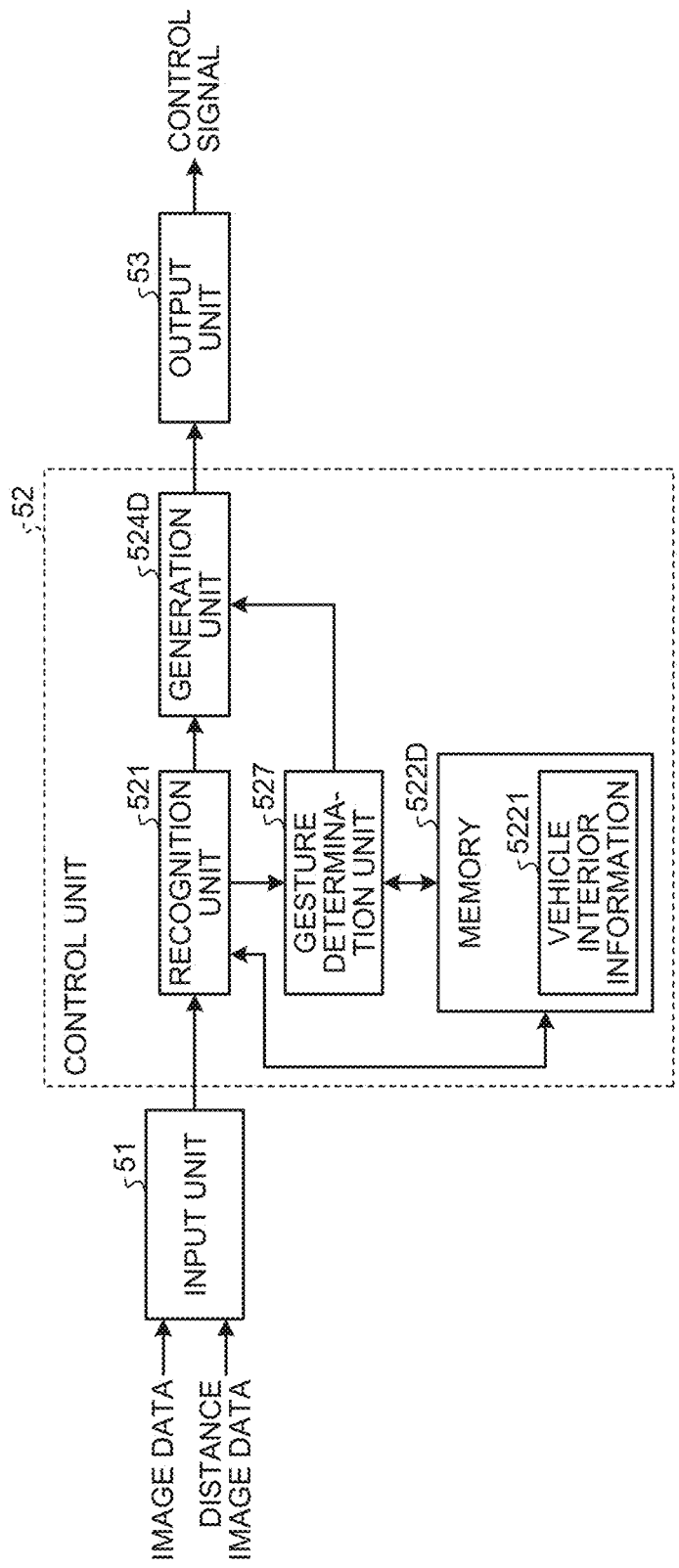
FIG. 23 is a block diagram illustrating a functional configuration of a control unit according to the fifth embodiment.

FIG. 23 is a block diagram illustrating the functional configuration of the control unit 52D.

The control unit 52D includes a gesture determination unit 527 instead of the calculation unit 523 of the control unit 52 according to the first embodiment described above. Furthermore, the control unit 52D includes a memory 522D and a generation unit 524D instead of the memory 522 and the generation unit 524 of the control unit 52 according to the first embodiment described above.

The memory 522D stores vehicle interior information regarding vehicle interior of the moving body 10. Here, the vehicle interior information is 3D data indicating a vehicle interior space of the moving body 10 and position information indicating positions of various members, for example, an A pillar, a B pillar, and the like.

On the basis of the depth information image data input via the input unit 51 and the recognition result recognized by the recognition unit 521, the gesture determination unit 527 determines a gesture (action) of the passenger of the moving body 10, and outputs this determination result to the generation unit 524D. Here, the gesture is a position and a direction pointed by the passenger with a finger or the like, a line of sight of the passenger, a motion of the passenger, an action, and the like.

The generation unit 524D generates a control signal for adjusting the focus state of the video projected by the projector 20 on the basis of the recognition result recognized by the recognition unit 521 and the determination result determined by the gesture determination unit 527. The generation unit 524D outputs a control signal to the projector 20 via the output unit 53.

6-4. Processing of Projection System

Next, the processing executed by the projection system 1D will be described.

Figure 24:
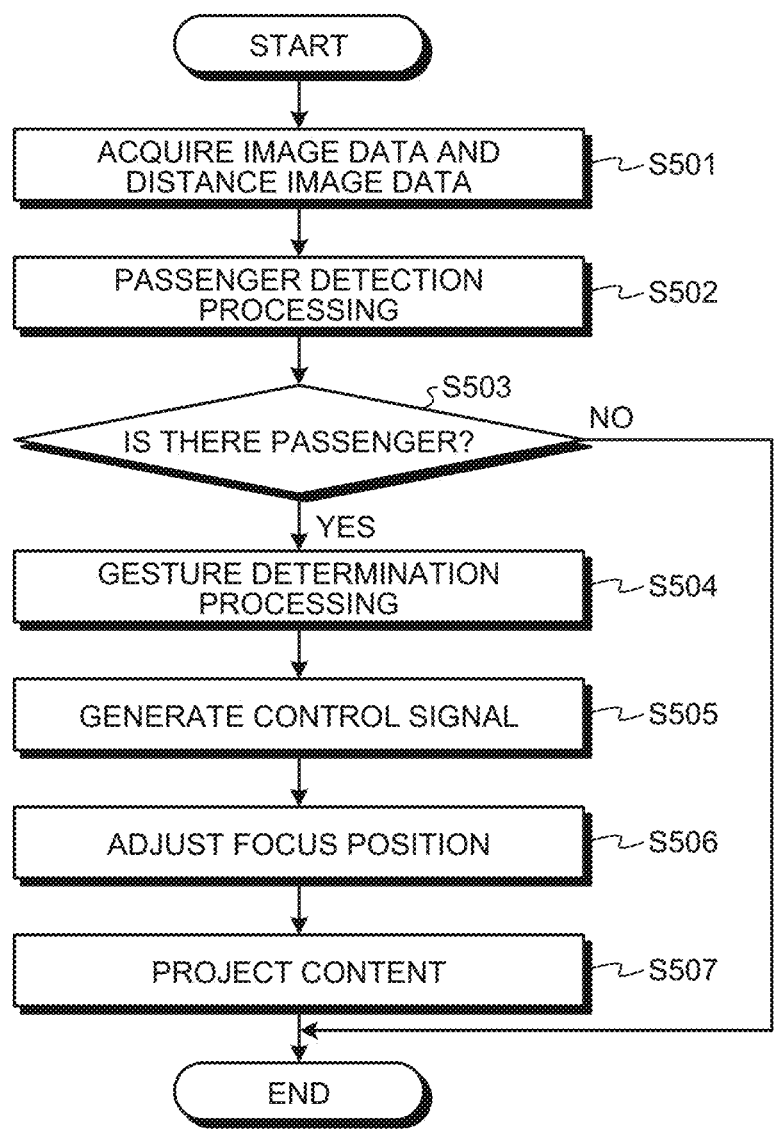
FIG. 24 is a flowchart illustrating an outline of processing executed by the projection system according to the fifth embodiment.

FIG. 24 is a flowchart illustrating an outline of processing executed by the projection system 1D.

As illustrated in FIG. 24, first, the input unit 51 acquires image data from the camera 31 and depth information image data from the TOP camera (step S501).

Steps S502 and S503 correspond to steps S102 and S103 described above, respectively.

In step S504, the gesture determination unit 527 determines a gesture (action) of the passenger of the moving body 10 on the basis of the depth information image data input via the input unit 51 and the recognition result recognized by the recognition unit 521.

Subsequently, the generation unit 524D generates a control signal for adjusting the focus state of the video projected by the projector 20 on the basis of the recognition result recognized by the recognition unit 521 and the determination result determined by the gesture determination unit 527 (step S505). In order to have communication while being seated on the front and rear seats, the passengers desire to notify the passenger seated on the front seat 12 of what the passenger seated on the rear seat 13 is gazing at (the position of the line of sight). Furthermore, with a general pointer, information being gazed is hidden by the pointer itself, and thus necessary information is insufficient. Therefore, the generation unit 524D generates a control signal for adjusting the focus state of the video projected by the projector 20 on the basis of the recognition result recognized by the recognition unit 521 and the determination result determined by the gesture determination unit 527. This causes the passenger to be projected with video in which the focus position is aligned with a region including gesture of another passenger, for example, a position pointed by another passenger. As a result, all the passengers can perform smooth communication.

Steps S506 and S507 correspond to steps S107 and S108 described above, respectively.

6-5. Actions and Effects

According to the fifth embodiment described above, since the generation unit 524D generates a control signal for adjusting the focus state of the video projected by the projector 20 on the basis of the recognition result recognized by the recognition unit 521 and the determination result determined by the gesture determination unit 527, the focus position of the video projected by the projector 20 can be adjusted to a position according to the intention of the passenger.

7. Sixth Embodiment

Next, the sixth embodiment will be described. The projection system according to the sixth embodiment is different in configuration from the sensor unit 30 and the control device 50 of the projection system 1 according to the first embodiment described above. Hereinafter, the projection system according to the sixth embodiment will be described. Note that the same components as those of the projection system 1 according to the first embodiment described above are denoted by the same reference signs, and detailed description will be omitted.

7-1. Functional Configuration of Projection System

Figure 25:
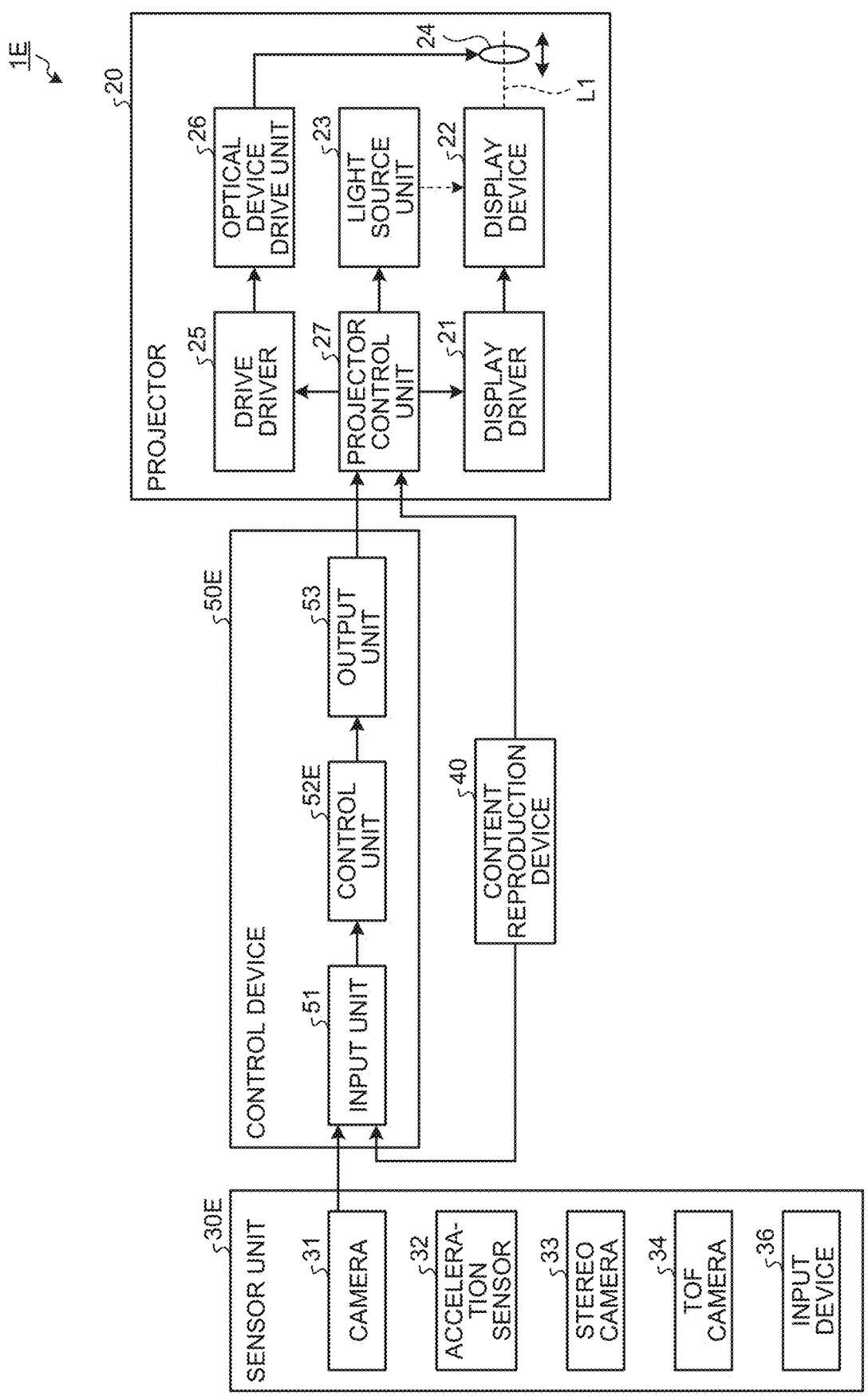
FIG. 25 is a block diagram illustrating a functional configuration of a projection system according to a sixth embodiment.

FIG. 25 is a block diagram illustrating a functional configuration of the projection system according to the sixth embodiment.

A projection system 1E illustrated in FIG. 25 includes a sensor unit 30E and a control device 50E instead of the sensor unit 30 and the control device 50 of the projection system 1 according to the first embodiment described above.

7-2. Configuration of Sensor Unit

First, the configuration of the sensor unit 30E will be described.

The sensor unit 30E includes the camera 31, the acceleration sensor 32, the stereo camera 33, the TOF camera 34, and an input device 36.

The input device 36 receives input operation by the passenger and outputs, to the control device 50E, input information corresponding to the received operation. The input device 36 is achieved by using a button, a switch, a touchscreen, a jog dial, and the like.

7-3. Configuration of Control Device

Next, the configuration of the control device 50 will be described.

The control device 50E includes a control unit 52E instead of the control unit 52 according to the first embodiment described above.

On the basis of various types of information input from the sensor unit 30E via the input unit 51, the control unit 52E generates a control signal for adjusting the focus state of the video projected by the projector 20, and outputs this control signal to the projector 20.

7-3-1. Functional Configuration of Control Unit

Figure 26:
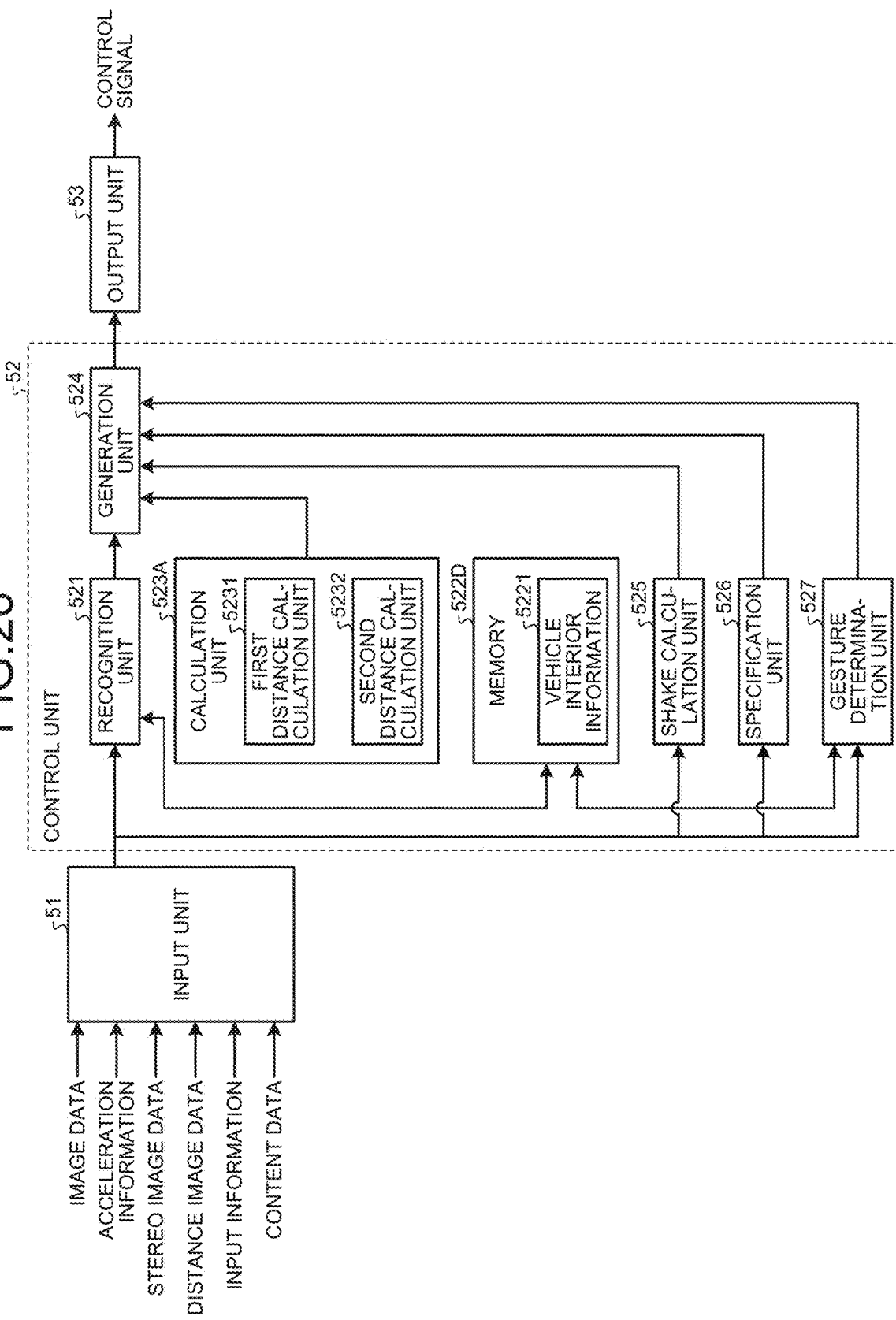
FIG. 26 is a block diagram illustrating a functional configuration of a control unit according to the sixth embodiment.

FIG. 26 is a block diagram illustrating the functional configuration of the control unit 52E. The control unit 52E illustrated in FIG. 26 includes the recognition unit 521 described in the first to fifth embodiments described above, the memory 522, a calculation unit 523A, the shake calculation unit 525, the specification unit 526, and the gesture determination unit 527. Furthermore, the control unit 52E includes a generation unit 524E instead of the generation unit 524 according to the first embodiment described above.

The generation unit 524 generates a control signal for adjusting the focus state of the video projected by the projector 20 on the basis of at least one of the recognition result of the recognition unit 521, the calculation result of the calculation unit 523A, the calculation result of the shake calculation unit 525, the specification result of the specification unit 526, and the determination result of the gesture determination unit 527.

7-4. Processing of Projection System

Next, the processing executed by the projection system 1E will be described.

Figure 27:
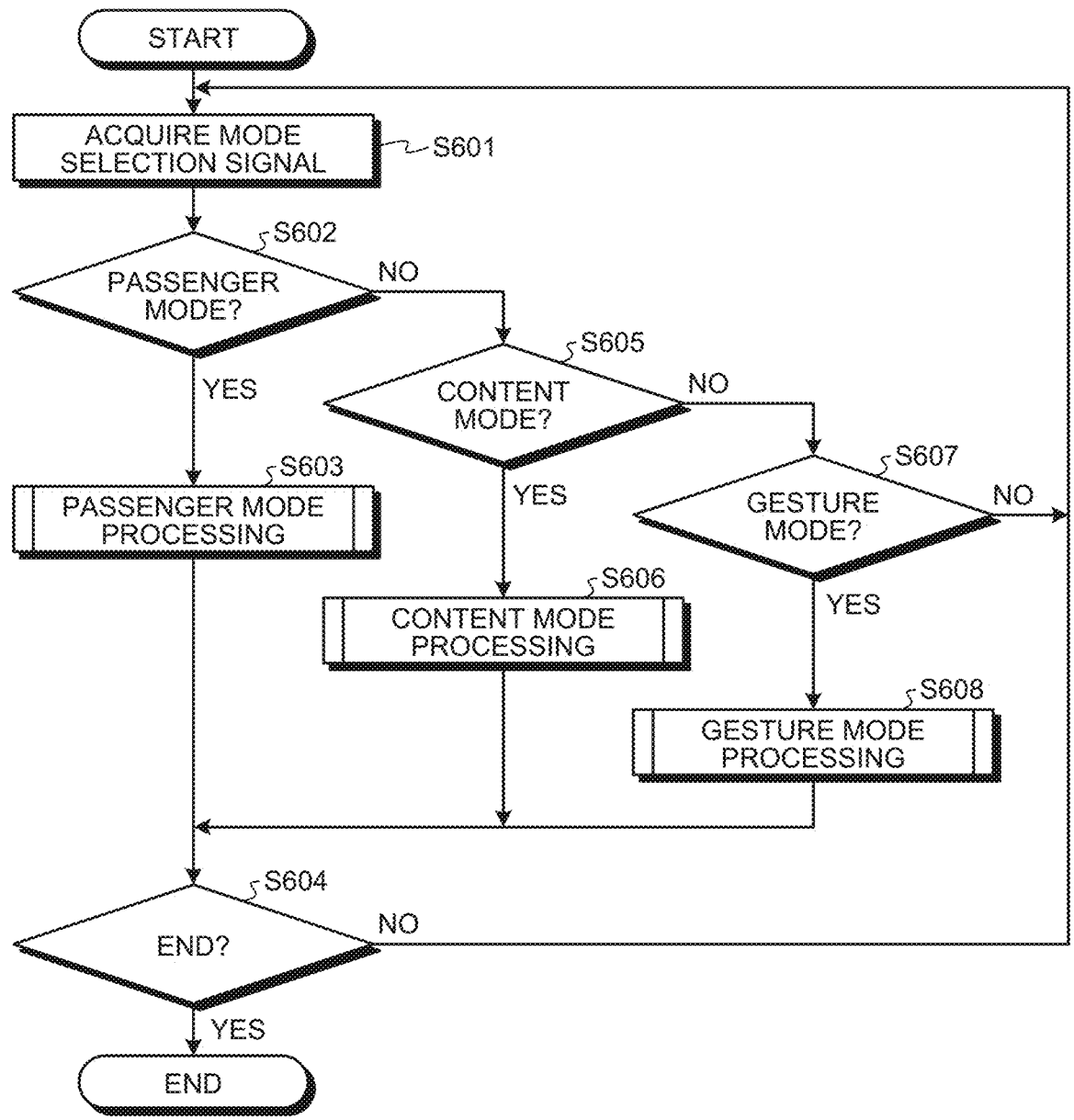
FIG. 27 is a flowchart illustrating an outline of processing executed by the projection system according to the sixth embodiment.

FIG. 27 is a flowchart illustrating an outline of processing executed by the projection system 1E.

As illustrated in FIG. 27, first, the input unit 51 acquires a mode selection signal input from the input device 36 (step S601).

Subsequently, the control unit 52E determines whether or not the mode selection signal is a passenger mode (step S602). When the control unit 52E determines that the mode selection signal is the passenger mode (step S602: Yes), the projection system 1E proceeds to step S603 described later. On the other hand, when the control unit 52E determines that the mode selection signal is not the passenger mode (step S602: No), the projection system 1E proceeds to step S605 described later.

In step S603, the projection system 1E executes passenger mode processing of generating a control signal for adjusting the focus state of the video projected by the projector 20 and outputting the control signal to the projector 20 on the basis of the number of passengers of the moving body 10, the seating position, and the shake of the moving body 10. Detail of the passenger mode processing is similar processing to processing of any one of steps S101 to S108 in FIG. 5, steps S201 to S209 in FIG. 14, and steps S301 to S309 in FIG. 17 described above, and therefore detailed description will be omitted. After step S603, the projection system 1E proceeds to step S604 described later.

In step S604, the control unit 52E determines whether or not an instruction signal for ending has been input from the input device 36. When the control unit 52E determines that an instruction signal for end has been input from the input device 36 (step S604: Yes), the projection system 1E ends the present processing. On the other hand, when the control unit 52E determines that an instruction signal for end has not been input from the input device 36 (step S604: No), the projection system 1E returns to step S601 described above.

In step S605, the control unit 52E determines whether or not the mode selection signal is a content mode. When the control unit 52E determines that the mode selection signal is a content mode (step S605: Yes), the projection system 1E proceeds to step S606 described later. On the other hand, when the control unit 52E determines that the mode selection signal is not a content mode (step S605: No), the projection system 1E proceeds to step S607 described later.

In step S606, the projection system 1E executes content mode processing of adjusting the focus state of the video projected by the projector 20 on the basis of the content data. Detail of the content mode processing is similar to that in steps S401 to S408 in FIG. 20 described above, and therefore detailed description will be omitted. After step S606, the projection system 1E proceeds to step S604.

In step S607, the control unit 52E determines whether or not the mode selection signal is a gesture mode. When the control unit 52E determines that the mode selection signal is a gesture mode (step S607: Yes), the projection system 1E proceeds to step S608 described later. On the other hand, when the control unit 52E determines that the mode selection signal is not a gesture mode (step S607: No), the projection system 1E returns to step S601 described above.

In step S608, the projection system 1E executes gesture mode processing of generating a control signal for adjusting the focus state of the video projected by the projector 20 on the basis of the gesture of the passenger. Detail of the gesture mode processing is similar to that in steps S501 to S507 in FIG. 24 described above, and therefore detailed description will be omitted. After step S608, the projection system 1E proceeds to step S604 described later.

7-5. Actions and Effects

According to the sixth embodiment described above, since the control unit 52 performs processing according to the mode selection signal input from the input device 36, it is possible to provide the most appropriate video according to the mode desired by the passenger.

8. Application Example to Moving Body

The technique according to the present disclosure can be applied to various products. For example, the technique according to the present disclosure may be achieved as a device mounted on a moving body of a type of any of an automobile, an electric vehicle, a hybrid electric vehicle, a motorcycle, a bicycle, a personal mobility, an airplane, a drone, a ship, a robot, a construction machine, an agricultural machine (tractor), and the like.

Figure 28:
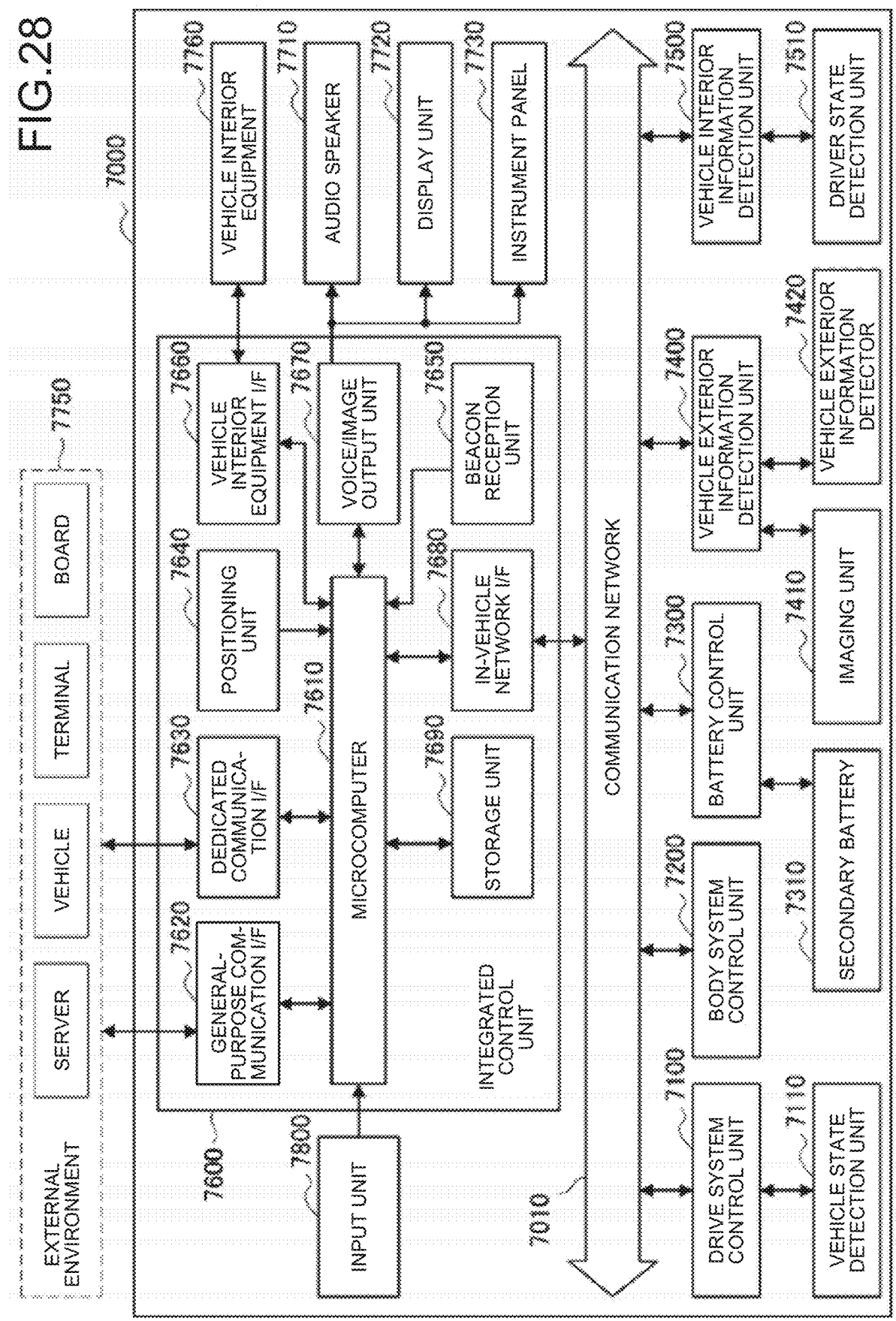
FIG. 28 is a block diagram illustrating a schematic configuration example of a vehicle control system that is an example of a moving body control system to which the technique according to the present disclosure can be applied.

FIG. 28 is a block diagram illustrating a schematic configuration example of a vehicle control system 7000, which is an example of a moving body control system to which the technique according to the present disclosure can be applied.

The vehicle control system 7000 includes a plurality of electronic control units connected via a communication network 7010. In the example illustrated in FIG. 28, the vehicle control system 7000 includes a drive system control unit 7100, a body system control unit 7200, a battery control unit 7300, a vehicle exterior information detection unit 7400, a vehicle interior information detection unit 7500, and an integrated control unit 7600. The communication network 7010 connecting the plurality of control units may be, for example, an in-vehicle communication network conforming to a discretionary standard such as a controller area network (CAN), a local interconnect network (LIN), a local area network (LAN), or FlexRay (registered trademark).

Each control unit includes a microcomputer that performs arithmetic processing according to various programs, a storage unit that stores programs executed by the microcomputer, parameters used for various arithmetic operations, and the like, and a drive circuit that drives various control target devices. Each control unit includes a network I/F for communicating with other control units via the communication network 7010, and a communication I/F for communicating with devices, sensors, or the like inside and outside the vehicle by wired communication or wireless communication. FIG. 28 illustrates, as a functional configuration of the integrated control unit 7600, a microcomputer 7610, a general-purpose communication I/F 7620, a dedicated communication I/F 7630, a positioning unit 7640, a beacon reception unit 7650, vehicle interior equipment I/F 7660, a voice/image output unit 7670, an in-vehicle network I/F 7680, and a storage unit 7690. Another control unit similarly includes a microcomputer, a communication I/F, and a storage unit.

The drive system control unit 7100 controls the operation of a device related to the drive system of the vehicle according to various programs. For example, the drive system control unit 7100 functions as a control device of a driving force generation device for generating driving force of a vehicle such as an internal combustion engine or a drive motor, a driving force transmission mechanism for transmitting the driving force to wheels, a steering mechanism for adjusting a steering angle of the vehicle, a braking device for generating braking force of the vehicle, and the like. The drive system control unit 7100 may have a function as a control device such as an antilock brake system (ABS) or an electronic stability control (ESC).

The drive system control unit 7100 is connected with a vehicle state detection unit 7110. The vehicle state detection unit 7110 includes at least one of, for example, a gyro sensor that detects an angular velocity of axial rotational motion of the vehicle body, an acceleration sensor that detects acceleration of the vehicle, or a sensor for detecting an operation amount of the accelerator pedal, an operation amount of the brake pedal, the steering angle of the steering wheel, an engine speed, a wheel rotation speed, or the like. The drive system control unit 7100 performs arithmetic processing using a signal input from the vehicle state detection unit 7110, and controls an internal combustion engine, a drive motor, an electric power steering device, a brake device, or the like.

The body system control unit 7200 controls operations of various devices mounted on the vehicle body according to various programs. For example, the body system control unit 7200 functions as a keyless entry system, a smart key system, a power window device, or a control device of various lamps such as a head lamp, a back lamp, a brake lamp, a blinker, or a fog lamp. In this case, radio waves transmitted from a portable device that substitutes for the key or signals of various switches can be input to the body system control unit 7200. The body system control unit 7200 receives input of these radio waves or signals, and controls a door lock device, a power window device, a lamp, and the like of the vehicle.

The battery control unit 7300 controls a secondary battery 7310, which is a power supply source of the drive motor, according to various programs. For example, information such as battery temperature, battery output voltage, or a remaining capacity of a battery is input to the battery control unit 7300 from a battery device including the secondary battery 7310. The battery control unit 7300 performs arithmetic processing using these signals, and performs temperature adjustment control of the secondary battery 7310 or control of a cooling device or the like included in the battery device.

The vehicle exterior information detection unit 7400 detects information outside the vehicle mounted with the vehicle control system 7000. For example, at least one of an imaging unit 7410 and a vehicle exterior information detector 7420 is connected to the vehicle exterior information detection unit 7400. The imaging unit 7410 includes at least one of a time of flight (ToF) camera, a stereo camera, a monocular camera, an infrared camera, or another camera. The vehicle exterior information detector 7420 includes, for example, at least one of an environment sensor for detecting current weather or meteorological phenomenon, or a surrounding information detection sensor for detecting another vehicle, an obstacle, a pedestrian, or the like around the vehicle mounted with the vehicle control system 7000.

The environment sensor may be, for example, at least one of a raindrop sensor that detects rainy weather, a fog sensor that detects fog, a sunshine sensor that detects a degree of sunshine, and a snow sensor that detects snowfall. The surrounding information detection sensor may be at least one of an ultrasonic sensor, a radar device, or a light detection and ranging, laser imaging detection and ranging (LIDAR) device. The imaging unit 7410 and the vehicle exterior information detector 7420 may be provided as independent sensors or devices, or may be provided as a device in which a plurality of sensors or devices are integrated.

Figure 29:
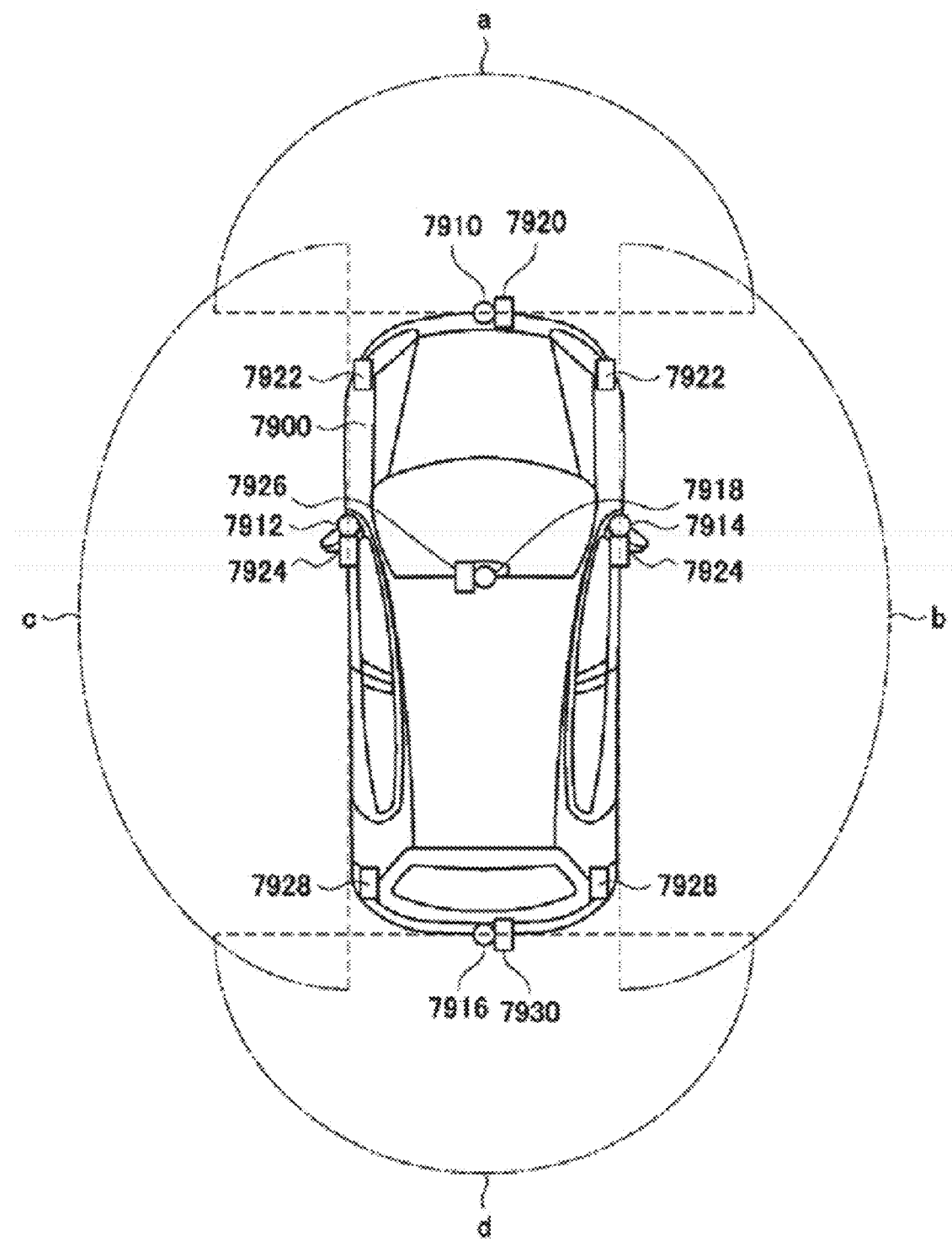
FIG. 29 is a view illustrating an example of installation positions of an imaging unit and a vehicle exterior information detection unit.

Here, FIG. 29 illustrates an example of installation positions of the imaging unit 7410 and the vehicle exterior information detector 7420. Imaging units 7910, 7912, 7914, 7916, and 7918 are provided, for example, at least one position of a front nose, a side mirror, a rear bumper, a back door, and an upper part of a windshield in vehicle interior of a vehicle 7900. The imaging unit 7910 provided at the front nose and the imaging unit 7918 provided at the upper part of the windshield in the vehicle interior mainly acquire images in front of the vehicle 7900. The imaging units 7912 and 7914 provided at the side mirrors mainly acquire images of the sides of the vehicle 7900. The imaging unit 7916 provided on the rear bumper or the back door mainly acquires an image behind the vehicle 7900. The imaging unit 7918 provided at the upper part of the windshield in the vehicle interior is mainly used to detect a preceding vehicle, a pedestrian, an obstacle, a traffic light, a traffic sign, a lane, or the like.

Note that FIG. 29 illustrates an example of imaging ranges of the imaging units 7910, 7912, 7914, and 7916. An imaging range a indicates an imaging range of the imaging unit 7910 provided at the front nose, imaging ranges b and c indicate imaging ranges of the imaging units 7912 and 7914 provided at the respective side mirrors, and an imaging range d indicates an imaging range of the imaging unit 7916 provided at the rear bumper or the back door. For example, by superimposing image data imaged by the imaging units 7910, 7912, 7914, and 7916, a bird's-eye view image of the vehicle 7900 viewed from above is obtained.

Vehicle exterior information detection units 7920, 7922, 7924, 7926, 7928, and 7930 provided at the front, rear, sides, corners, and the upper part of the windshield in the vehicle interior of the vehicle 7900 may be, for example, ultrasonic sensors or radar devices. The vehicle exterior information detection units 7920, 7926, and 7930 provided at the front nose, the rear bumper, the back door, and the upper part of the windshield in the vehicle interior of the vehicle 7900 may be, for example, LIDAR devices. These vehicle exterior information detection units 7920 to 7930 are mainly used for detecting a preceding vehicle, a pedestrian, an obstacle, or the like.

Returning to FIG. 28, the description will be continued. The vehicle exterior information detection unit 7400 causes the imaging unit 7410 to image an image outside the vehicle, and receives the imaged image data. The vehicle exterior information detection unit 7400 receives detection information from the connected vehicle exterior information detector 7420. In a case where the vehicle exterior information detector 7420 is an ultrasonic sensor, a radar device, or a LIDAR device, the vehicle exterior information detection unit 7400 transmits ultrasonic waves, electromagnetic waves, or the like, and receives information of received reflected waves. The vehicle exterior information detection unit 7400 may perform object detection processing or distance detection processing of a human, a vehicle, an obstacle, a sign, a character on a road surface, or the like on the basis of the received information. The vehicle exterior information detection unit 7400 may perform environment recognition processing of recognizing rainfall, fog, road surface conditions, or the like on the basis of the received information. The vehicle exterior information detection unit 7400 may calculate a distance to an object outside the vehicle on the basis of the received information.

The vehicle exterior information detection unit 7400 may perform image recognition processing or distance detection processing of a human, a vehicle, an obstacle, a sign, a character on a road surface, or the like on the basis of the received image data. The vehicle exterior information detection unit 7400 may perform processing such as distortion correction or alignment on the received image data, and combine image data imaged by the different imaging unit 7410 to generate a bird's-eye view image or a panoramic image. The vehicle exterior information detection unit 7400 may perform viewpoint conversion processing using the image data imaged by the different imaging unit 7410.

The vehicle interior information detection unit 7500 detects information on vehicle interior. The vehicle interior information detection unit 7500 is connected with a driver state detection unit 7510 that detects the state of the driver, for example. The driver state detection unit 7510 may include a camera that images the driver, a biological sensor that detects biological information of the driver, and a microphone that collects voice in the vehicle interior. The biological sensor is provided, for example, on a seat surface, a steering wheel, or the like, and detects biological information of a passenger sitting on a seat or the driver holding the steering wheel. The vehicle interior information detection unit 7500 may calculate the degree of fatigue or the degree of concentration of the driver or may determine whether or not the driver is dozing on the basis of the detection information input from the driver state detection unit 7510. The vehicle interior information detection unit 7500 may perform processing such as noise canceling processing on a collected voice signal.

The integrated control unit 7600 controls the overall operation in the vehicle control system 7000 according to various programs. The integrated control unit 7600 is connected with an input unit 7800. The input unit 7800 is achieved by, for example, a device that can be operated by a passenger for input such as a touchscreen, a button, a microphone, a switch, or a lever. Data obtained by performing voice recognition on the voice input by the microphone may be input to the integrated control unit 7600. The input unit 7800 may be, for example, a remote control device using infrared rays or other radio waves, or external connection equipment such as a mobile phone or a personal digital assistant (PDA) corresponding to the operation of the vehicle control system 7000. The input unit 7800 may be, for example, a camera, and in this case, the passenger can input information by gesture. Alternatively, data obtained by detecting motion of a wearable device worn by the passenger may be input. Furthermore, the input unit 7800 may include, for example, an input control circuit or the like that generates an input signal on the basis of information input by a passenger or the like using the input unit 7800 and outputs the input signal to the integrated control unit 7600. By operating this input unit 7800, the passenger or the like inputs various data to the vehicle control system 7000 and instructs processing operation.

The storage unit 7690 may include a read only memory (ROM) that stores various programs to be executed by the microcomputer, and a random access memory (RAM) that stores various parameters, arithmetic results, sensor values, and the like. The storage unit 7690 may be achieved by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various pieces of equipment existing in an external environment 7750. The general-purpose communication I/F 7620 may implement a cellular communication protocol such as Global System of Mobile communications (GSM) (registered trademark), WiMAX (registered trademark), Long Term Evolution (LTE) (registered trademark), or LTE-Advanced (LTE-A), or other wireless communication protocols such as a wireless LAN (also referred to as Wi-Fi (registered trademark)) and Bluetooth (registered trademark). The general-purpose communication I/F 7620 may be connected to equipment (for example, an application server or a control server) existing on an external network (for example, the Internet, a cloud network, or a company-specific network) via, for example, a base station or an access point. Using, for example, a peer to peer (P2P) technology, the general-purpose communication I/F 7620 may be connected to a terminal (for example, a terminal of a driver, a pedestrian, or a store, or a machine type communication (MTC) terminal) existing in the vicinity of the vehicle.

The dedicated communication I/F 7630 is a communication I/F that supports a communication protocol formulated for use in a vehicle. For example, the dedicated communication I/F 7630 may implement a standard protocol such as wireless access in vehicle environment (WAVE), which is combination of IEEE802.11p of the lower layer and IEEE1609 of the upper layer, dedicated short range communications (DSRC), or a cellular communication protocol. The dedicated communication I/F 7630 typically performs V2X communication, which is a concept including one or more of vehicle to vehicle communication, vehicle to infrastructure communication, vehicle to home communication, and vehicle to pedestrian communication.

The positioning unit 7640 receives, for example, a global navigation satellite system (GNSS) signal (for example, a global positioning system (GPS) signal from a GPS satellite) from a GNSS satellite, executes positioning, and generates position information including the latitude, longitude, and altitude or the vehicle. Note that the positioning unit 7640 may specify the current position by exchanging signals with a wireless access point, or may acquire position information from a terminal such as a mobile phone, a PHS, or a smartphone having a positioning function.

The beacon reception unit 7650 receives radio waves or electromagnetic waves transmitted from a wireless station or the like installed on a road, for example, and acquires information such as a current position, traffic jam, closed roads, required time, and the like. Note that the function of the beacon reception unit 7650 may be included in the dedicated communication I/F 7630 described above.

The vehicle interior equipment I/F 7660 is a communication interface that mediates connection between the microcomputer 7610 and various pieces of vehicle interior equipment 7760 existing in the vehicle. The vehicle interior equipment I/F 7660 may establish wireless connection using a wireless communication protocol such as wireless LAN, Bluetooth (registered trademark), near field communication (NFC), or wireless USB (WUSB). The vehicle interior equipment I/F 7660 may establish wired connection such as universal serial bus (USB), high-definition multimedia interface (HDMI) (registered trademark), or mobile high-definition link (MHL) via a connection terminal (and, if necessary, a cable) not illustrated. The vehicle interior equipment 7760 may include, for example, at least one of mobile equipment or wearable equipment possessed by a passenger, or information equipment carried in or attached to the vehicle. The vehicle interior equipment 7760 may include a navigation device that performs route search to a discretionary destination. The vehicle interior equipment I/F 7660 exchanges control signals or data signals with the vehicle interior equipment 7760.

The in-vehicle network I/F 7680 is an interface that mediates communication between the microcomputer 7610 and the communication network 7010. The in-vehicle network I/F 7680 transmits and receives signals and the like in accordance with a predetermined protocol supported by the communication network 7010.

The microcomputer 7610 of the integrated control unit 7600 controls the vehicle control system 7000 according to various programs on the basis of information acquired via at least one of the general-purpose communication I/F 7620, the dedicated communication I/F 7630, the positioning unit 7640, the beacon reception unit 7650, the vehicle interior equipment I/F 7660, and the in-vehicle network I/F 7680. For example, the microcomputer 7610 may perform arithmetic operation for a control target value of the diving force generation device, the steering mechanism, or the braking device on the basis of the acquired information regarding the inside and outside of the vehicle, and output a control command to the drive system control unit 7100. For example, the microcomputer 7610 may perform cooperative control for the purpose of implementing functions of an advanced driver assistance system (ADAS) including vehicle collision avoidance or impact mitigation, follow-up traveling based on an inter-vehicle distance, vehicle speed maintenance traveling, vehicle collision warning, vehicle lane departure warning, or the like. The microcomputer 7610 may perform cooperative control for the purpose of automatic driving or the like in which the vehicle autonomously travels without depending on operation of the driver by controlling the driving force generation device, the steering mechanism, the braking device, or the like on the basis of the acquired information on surrounding of the vehicle.

The microcomputer 7610 may generate three-dimensional distance information between the vehicle and an object such as a surrounding structure or a human on the basis of information acquired via at least one of the general-purpose communication I/F 7620, the dedicated communication I/F 7630, the positioning unit 7640, the beacon reception unit 7650, the vehicle interior equipment I/F 7660, and the in-vehicle network I/F 7680, and create local map information including periphery information of the current position of the vehicle. The microcomputer 7610 may predict danger such as vehicle collision, approach of a pedestrian or the like, or entry into a closed road on the basis of the acquired information, and generate a warning signal. The warning signal may be a signal for generating a warning sound or turning on a warning lamp, for example.

The voice/image output unit 7670 transmits an output signal of at least one of voice or an image to an output device capable of visually or audibly notifying a passenger of the vehicle or vehicle exterior of information. In the example of FIG. 28, an audio speaker 7710, a display unit 7720, and an instrument panel 7730 are illustrated as an example of the output device. The display unit 7720 may include, for example, at least one of an on-board display and a head-up display. The display unit 7720 may have an augmented reality (AR) display function. The output device may be another device other than these devices, such as a headphone, a wearable device such as an eyeglass-type display worn by a passenger, a projector, or a lamp. When the output device is a display device, the display device visually displays, in various forms such as teat, images, tables, and graphs, results obtained by various processing performed by the microcomputer 7610 or information received from control units. When the output device is a voice output device, the voice output device converts, into an analog signal, and aurally outputs, an audio signal including reproduced voice data, acoustic data, or the like.

Note that in the example illustrated in FIG. 28, at least two control units connected via the communication network 7010 may be integrated as one control unit. Alternatively, each control unit may include a plurality of control units. Furthermore, the vehicle control system 7000 may include another control unit (not illustrated). In the above description, some or all of the functions performed by any control unit may be provided to other control units. That is, as long as information is transmitted and received via the communication network 7010, predetermined arithmetic processing may be performed by any control unit. Similarly, a sensor or a device connected to any control unit may be connected to another control unit, and a plurality of control units may mutually transmit and receive detection information via the communication network 7010.

Note that a computer program for implementing each function of the projection system 1 according to the present embodiment described with reference to FIG. 1 can be implemented on any control unit or the like. It is also possible to provide a computer-readable recording medium storing such a computer program. The recording medium is, for example, a magnetic disk, an optical disk, a magneto-optical disk, a flash memory, or the like. The computer program described above may be distributed via, for example, a network without using a recording medium.

In the vehicle control system 7000 described above, the projection system 1 according to the present embodiment described with reference to FIG. 1 can be applied to the integrated control unit 7600 of the application example illustrated in FIG. 28. For example, the sensor unit 30 and the control device 50 of the projection system 1 correspond to the microcomputer 7610, the imaging unit 7410, and the driver state detection unit 7510 of the integrated control unit 7600. However, the present invention is not limited to this, and the vehicle control system 7000 may correspond to the control device 50 in FIG. 1.

At least some components of the projection system 1 according to the present embodiment described with reference to FIG. 1 may be implemented in a module (for example, an integrated circuit module including one die) for the integrated control unit 7600 illustrated in FIG. 28. Alternatively, the projection system 1 according to the present embodiment described with reference to FIG. 1 may be implemented by the plurality of control units of the vehicle control system 7000 illustrated in FIG. 28.

9. Conclusions

Various forms can be formed by appropriately combining the plurality of components disclosed in each of the projection systems according to the first to sixth embodiments of the present disclosure described above. For example, some components may be deleted from all the components described in the projection systems according to the first to sixth embodiments of the present disclosure described above. Furthermore, the components described in the projection systems according to the first to sixth embodiments of the present disclosure described above may be combined as appropriate.

In the projection systems according to the first to sixth embodiments of the present disclosure, the "unit" described above can be replaced with "means", "circuit", or the like. For example, the control unit can be replaced with a control means or a control circuit.

The program that the projection systems according to the first to sixth embodiments of the present disclosure are caused to execute is provided by being recorded in a computer-readable recording medium such as a CD-ROM, a flexible disk (FD), a CD-R, a digital versatile disk (DVD), a USB medium, or a flash memory as file data in an installable format or an executable format.

The program that the projection systems according to the first to fourth embodiments of the present disclosure are caused to execute may be stored on a computer connected to a network such as the Internet and provided by being downloaded via the network.

Note that in the description of the timing charts in the present description, the order of processing between timings is clearly indicated using expressions such as "first", "after", and "subsequently", but the order of processing necessary for carrying out the present disclosure is not uniquely determined by these expressions. That is, the order of processing in the timing charts described in the present description can be changed within a range without inconsistency.

Note that the effects described in the present description are merely examples and are not limited, and other effects may be present.

Note that the present technique can also have the following configurations.

(1)

A control device comprising:

a control unit that controls a state of video projected onto a predetermined projection plane by a projection device provided in a space in a moving body on a basis of space situation information input from a sensor that detects a space situation in the moving body.

(2)

The control device according to (1), wherein the control unit includes a recognition unit that recognizes a number of passengers and a seating position in the moving body on a basis of the space situation information; and a generation unit that generates a control signal for controlling a focus state of the video projected by the projection device on a basis of the number of people and the seating position.

(3)

The control device according to claim 2 further comprising:
a calculation unit that calculates, for each passenger recognized by the recognition unit, a distance between the seating position of the passenger recognized by the recognition unit and a projection plane of the video projected by the projection device, wherein
the generation unit
generates the control signal on a basis of the number of people, the seating position, and the distance for each of the passengers.

(4)

The control device according to (3), wherein
the recognition unit
recognizes at least one of a head position and an eye position of the passenger on a basis of the space situation information, and
the calculation unit
calculates the distance for each of the passengers on a basis of at least one of a head position and an eye position of the passenger and the seating position.

(5)

The control device according to (2), wherein
the generation unit
generates the control signal on a basis of the number of people, the seating position, and acceleration information acquired by an acceleration sensor that detects shake generated in the moving body.

(6)

The control device according to any one of (2) to (5), wherein
the sensor is any one or more of
a camera that generates color image data by imaging an inside of the moving body,
a stereo camera that generates parallax image data having parallax by imaging an inside of the moving body, and
a TOF camera that generates distance image data capable of detecting distance information for each pixel by imaging an inside of the moving body, and
the space situation information is any one or more of the color image data, the parallax image data, and the distance image data.

(7)

The control device according to (6), wherein
the recognition unit
recognizes the number of people and the seating position on a basis of any one or more of the image data, the parallax image data, and the distance image data.

(8)

The control device according to any one of (2) to (7), wherein
the generation unit
generates the control signal on a basis of content data as the video projected by the projection device.

(9)

The control device according to claim 8 further comprising:
a specification unit that specifies an emphasis position to be emphasized in the video on a basis of the content data, wherein
the generation unit
generates the control signal on a basis of the emphasis position.

(10)

The control device according to any one of (2) to (9), wherein
the sensor is
an interaction device that detects motion of the passenger in the moving body,
the space situation information is
motion of the passenger, and
the generation unit
generates the control signal on a basis of motion of the passenger.

(11)

The control device according to any one of (2) to (10), wherein
the control signal is
a signal for controlling a focus position of the projection device.

(12)

The control device according to any one of (2) to (10), wherein
the control signal is
a signal for adjusting brightness of the video projected by the projection device.

(13)

The control device according to any one of (1) to (12), wherein
the projection plane is
a free-form curved surface.

(14)

A projection system comprising:
a projection device that projects video onto a predetermined projection plane in a moving body;
a sensor that detects a space situation in the moving body; and
a control device that controls a state of the video on a basis of space situation information regarding a space situation detected by the sensor.

(15)

The projection system according to (14), wherein
the projection device includes
a projection lens that projects the video onto the predetermined projection plane; and
a drive unit that adjusts a focus position of the video by moving the projection lens along an optical path, and
the control device includes
a recognition unit that recognizes a number of passengers and a seating position in the moving body on a basis of the space situation information; and
a generation unit that generates a control signal for controlling a focus state of the video projected by the projection device on a basis of the number of people and the seating position.

(16)

The project on system according to (15), wherein
the control device further includes
a calculation unit that calculates, for each passenger recognized by the recognition unit, a distance between the seating position of the passenger recognized by the recognition unit and a projection plane of the video projected by the projection device, and
the generation unit
generates the control signal on a basis of the number of people, the seating position, and the distance for each of the passengers.

(17)

The projection system according to (16), wherein
the recognition unit
recognizes at least one of a head position and an eye position of the passenger on a basis of the space situation information, and
the calculation unit
calculates the distance for each of the passengers on a basis of at least one of a head position and an eye position of the passenger and the seating position.

(18)

The projection system according to (15), wherein
the generation unit
generates the control signal on a basis of the number of people, the seating position, and acceleration information acquired by an acceleration sensor that detects shake generated in the moving body.

(19)

A control method of controlling a projection device provided in a space in a moving body, the control method comprising:
controlling a state of video projected onto a predetermined projection plane by the projection device on a basis of space situation information input from a sensor that detects a space situation in the moving body.

(20)

A program for causing a control device that controls a projection device provided in a space in a moving body to execute
controlling a state of video projected onto a predetermined projection plane by the projection device on a basis of space situation information input from a sensor that detects a space situation in the moving body.

REFERENCE SIGNS LIST 1, 1A, 1B, 1C, 1D, 1E PROJECTION SYSTEM
10 MOVING BODY
20 PROJECTOR
24 PROJECTION LENS
26 OPTICAL DEVICE DRIVE UNIT
30, 30A, 30B, 30D, 30E SENSOR UNIT
31 CAMERA
32 ACCELERATION SENSOR
33 STEREO CAMERA
34 TOF CAMERA
35 INTERACTION DEVICE
36 INPUT DEVICE
40 CONTENT REPRODUCTION DEVICE
50, 50A, 50B, 50C, 50D, 50E CONTROL DEVICE
51 INPUT UNIT
52, 52A, 52B, 52C, 52D, 52E CONTROL UNIT
53 OUTPUT UNIT
521 RECOGNITION UNIT
522, 522 MEMORY
523, 523A, 523B CALCULATION UNIT
524, 524A, 524B, 524C, 524D, 524E GENERATION UNIT
525 SHAKE CALCULATION UNIT
526 SPECIFICATION UNIT
527 GESTURE DETERMINATION UNIT
5231 FIRST DISTANCE CALCULATION UNIT
5232 SECOND DISTANCE CALCULATION UNIT

The invention claimed is:

1. A control device comprising:
circuitry configured to
control a state of video projected onto a predetermined projection plane by a projection device provided in a space in a moving body based on space situation information input from a sensor that detects a space situation in the moving body,
recognize a number of passengers and a seating position of each of the passengers in the moving body based on the space situation information, and
generate a control signal for controlling a focus state of the video projected by the projection device based on the number of passengers and the seating position of each of the passengers.

2. The control device according to claim 1, wherein
the circuitry is further configured to
calculate, for each of the passengers, a distance between the seating position each of the passengers and the predetermined projection plane of onto which the video is projected by the projection device, and
generate the control signal based on the number of passengers, the seating position of each of the passengers, and the distance for each of the passengers.

3. The control device according to claim 2, wherein
the circuitry is further configured to
recognize at least one of a head position and an eye position of each of the passengers based on the space situation information, and
calculate the distance for each of the passengers based on at least one of the head position and the eye position of each of the passengers, and the seating position of each of the passengers.

4. The control device according to claim 1, wherein
the circuitry is further configured to
generate the control signal based on the number of passengers, the seating position of each of the passengers, and acceleration information acquired by an acceleration sensor that detects shake generated in the moving body.

5. The control device according to claim 1, wherein the sensor is any one or more of
a camera that generates color image data by imaging an inside of the moving body,
a stereo camera that generates parallax image data having parallax by imaging the inside of the moving body, and
a TOF camera that generates distance image data capable of detecting distance information for each pixel by imaging the inside of the moving body, and
the space situation information is any one or more of the color image data, the parallax image data, and the distance image data.

6. The control device according to claim 5, wherein
the circuitry is further configured to
recognize the number of passengers and the seating position of each of the passengers based on any one or more of the color image data, the parallax image data, and the distance image data.

7. The control device according to claim 1, wherein
the circuitry is further configured to
generate the control signal based on content data as the video projected by the projection device.

8. The control device according to claim 7, wherein
the circuitry is further configured to
specify an emphasis position to be emphasized in the video based on the content data, and generate the control signal based on the emphasis position.

9. The control device according to claim 1, wherein the sensor is an interaction device that detects motions of the passengers in the moving body,
the space situation informatation is the motions of the passengers, and
the circuitry is further configured to generate the control signal based on the motions of the passengers.

10. The control device according to claim 1, wherein the control signal is a signal for controlling a focus position of the projection device.

11. The control device according to claim 1, wherein the control signal is a signal for adjusting brightness of the video projected by the projection device.

12. The control device according to claim 1, wherein the predetermined projection plane is a free-form curved surface.

13. A projection system comprising:
a projection device that projects video onto a predetermined projection plane in a moving body;
a sensor that detects a space situation in the moving body; and
circuitry configured to
control a state of the video based on space situation information regarding a space situation detected by the sensor,
recognize a number of passengers and a seating position of each of the passengers in the moving body based on the space situation information, and
generate a control signal for controlling a focus state of the video projected by the projection device based on the number of passengers and the seating position of each of the passengers.

14. The projection system according to claim 13, wherein the projection device includes
a projection lens that projects the video onto the predetermined projection plane, and
a drive actuator that adjusts the focus state of the video by moving the projection lens along an optical path.

15. The projection system according to claim 13, wherein the circuitry is further configured to
calculate, for each of the passengers, a distance between the seating position of each of the passengers and the predetermined projection plane onto which the video is projected by the projection device, and
generate the control signal based on the number of passengers, the seating position of each of the passengers, and the distance for each of the passengers.

16. The projection system according to claim 15, wherein the circuitry is further configured to
recognize at least one of a head position and an eye position of each of the passengers based on the space situation information, and
calculate the distance for each of the passengers based on at least one of the head position and the eye position of each of the passengers, and the seating position of each of the passengers.

17. The projection system according to claim 14, wherein the circuitry is further configured to
generate the control signal based on the number of passengers, the seating position of each of the passengers, and acceleration information acquired by an acceleration sensor that detects shake generated in the moving body.

18. A control method of controlling a projection device provided in a space in a moving body, the control method comprising:
controlling a state of video projected onto a predetermined projection plane by a projection device in a moving body based on space situation information input from a sensor that detects a space situation in the moving body;
recognizing a number of passengers and a seating position of each of the passengers in the moving body based on the space situation information; and
generating a control signal for controlling a focus state of the video projected by the projection device based on the number of passengers and the seating position of each of the passengers.

19. A non-transitory computer-readable storage medium storing a program for causing circuitry that controls a projection device provided in a space in a moving body to execute:
controlling a state of video projected onto a predetermined projection plane by the projection device based on space situation information input from a sensor that detects a space situation in the moving body;
recognizing a number of passengers and a seating position of each of the passengers in the moving body based on the space situation information; and
generating a control signal for controlling a focus state of the video projected by the projection device based on the number of passengers and the seating position of each of the passengers.

* * * * *